US012603793B2

(12) United States Patent
Yanai et al.

(10) Patent No.: US 12,603,793 B2
(45) Date of Patent: Apr. 14, 2026

(54) ORACLE-DRIVEN BLOCKCHAIN

(71) Applicant: Soda Bubble Labs LTD, Bnei Brak (IL)

(72) Inventors: Avishay Yanai, Petach Tikva (IL); Meital Levy, Oranit (IL); Asaf Kozovsky, Tel Aviv (IL)

(73) Assignee: Soda Bubble Labs LTD, Bnei Brak (IL)

( * ) Notice: Subject to any disclaimer, the term of this patent is extended or adjusted under 35 U.S.C. 154(b) by 128 days.

(21) Appl. No.: 18/738,388

(22) Filed: Jun. 10, 2024

(65) Prior Publication Data

US 2025/0379756 A1     Dec. 11, 2025

(51) Int. Cl.
H04L 9/00          (2022.01)
(52) U.S. Cl.
CPC ..................................... H04L 9/50 (2022.05)
(58) Field of Classification Search
CPC ......................................................... H04L 9/50
See application file for complete search history.

(56) References Cited

U.S. PATENT DOCUMENTS

| 11,621,834 B2 | 4/2023 | Will et al. |
| 11,689,371 B2 | 6/2023 | Yadlin et al. |
| 11,874,827 B2 | 1/2024 | Wood et al. |
| 2022/0417003 A1 | 12/2022 | Giacomelli et al. |
| 2023/0106151 A1 | 4/2023 | Mohassel et al. |
| 2023/0120202 A1 | 4/2023 | Yanai |
| 2023/0412403 A1 | 12/2023 | Yu et al. |
| 2024/0202711 A1* | 6/2024 | Purandare ............. H04L 9/3239 |

* cited by examiner

*Primary Examiner* — Brian Whipple
(74) *Attorney, Agent, or Firm* — Fountainhead Law Group, PC

(57)          ABSTRACT
A novel blockchain network architecture and transaction processing workflow, collectively referred to as the oracle-driven blockchain approach, is disclosed. In certain embodiments, this approach enables a blockchain network to efficiently execute and validate transactions that require answers from an oracle by (1) separating block creation from transaction execution (such that each new block to be added to the network's blockchain is first created by one or more sequencing nodes before any of the transactions within the block are actually executed), and (2) ensuring that, as part of transaction execution, any output generated by the oracle which changes state is added to a transcript that is included within the block.

20 Claims, 10 Drawing Sheets

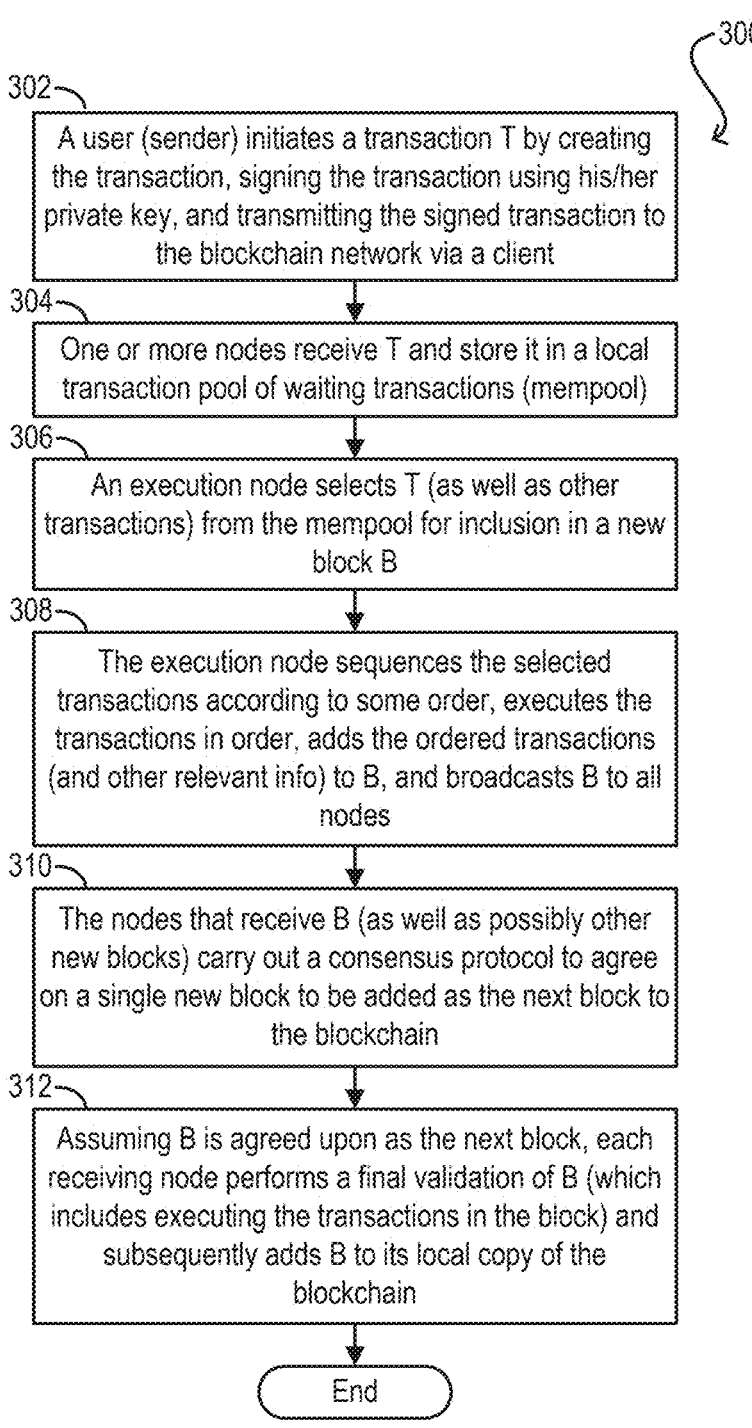

302 — A user (sender) initiates a transaction T by creating the transaction, signing the transaction using his/her private key, and transmitting the signed transaction to the blockchain network via a client 304 — One or more nodes receive T and store it in a local transaction pool of waiting transactions (mempool)

306 — An execution node selects T (as well as other transactions) from the mempool for inclusion in a new block B 308 — The execution node sequences the selected transactions according to some order, executes the transactions in order, adds the ordered transactions (and other relevant info) to B, and broadcasts B to all nodes 310 — The nodes that receive B (as well as possibly other new blocks) carry out a consensus protocol to agree on a single new block to be added as the next block to the blockchain 312 — Assuming B is agreed upon as the next block, each receiving node performs a final validation of B (which includes executing the transactions in the block) and subsequently adds B to its local copy of the blockchain End

*FIG. 3*

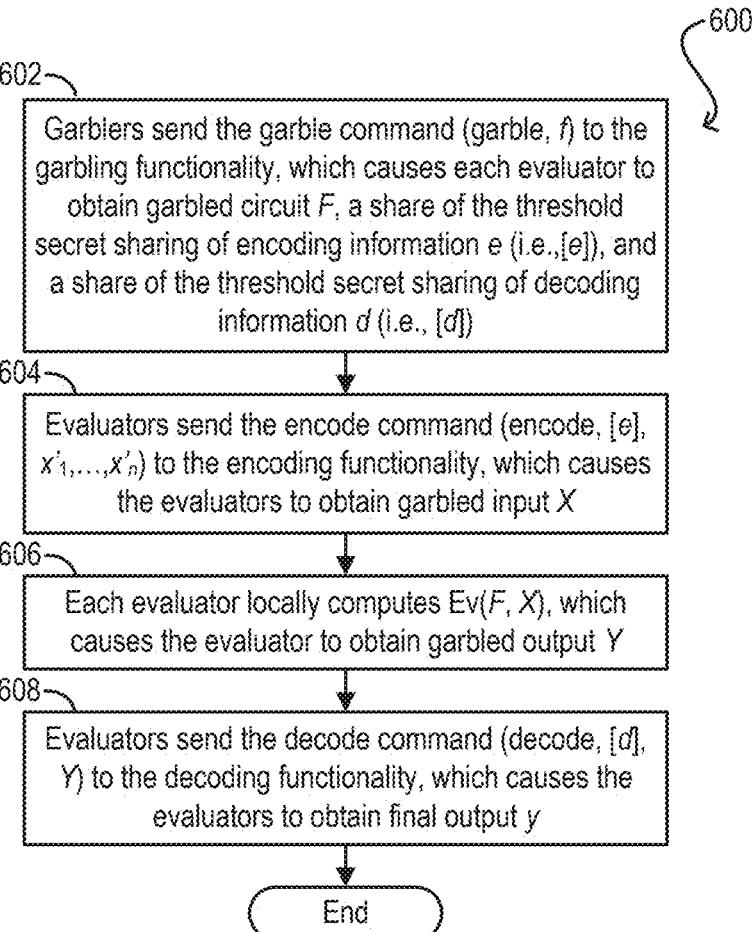

600

602

Garblers send the garble command (garble, *f*) to the garbling functionality, which causes each evaluator to obtain garbled circuit *F*, a share of the threshold secret sharing of encoding information *e* (i.e.,[*e*]), and a share of the threshold secret sharing of decoding information *d* (i.e., [*d*])

604

Evaluators send the encode command (encode, [*e*], $x'_1,...,x'_n$) to the encoding functionality, which causes the evaluators to obtain garbled input *X*

606

Each evaluator locally computes Ev(*F, X*), which causes the evaluator to obtain garbled output *Y*

608

Evaluators send the decode command (decode, [*d*], *Y*) to the decoding functionality, which causes the evaluators to obtain final output *y*

End

*FIG. 6*

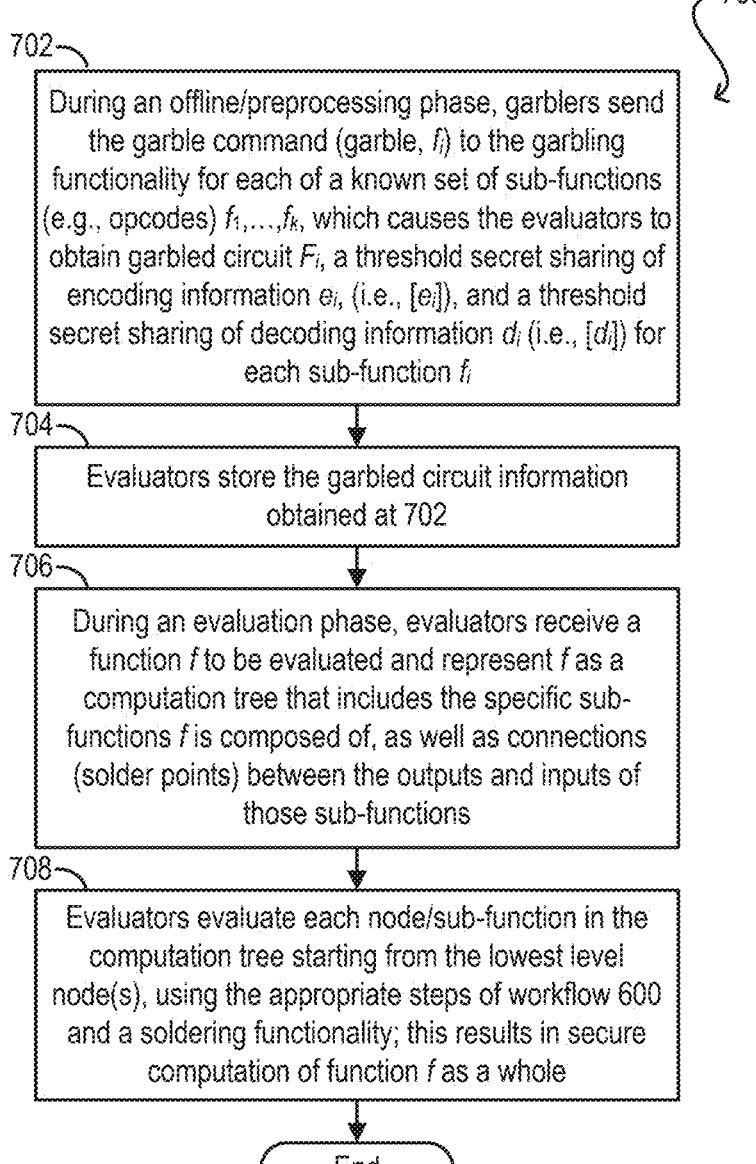

700

702

During an offline/preprocessing phase, garblers send the garble command (garble, $f_i$) to the garbling functionality for each of a known set of sub-functions (e.g., opcodes) $f_1,...,f_k$, which causes the evaluators to obtain garbled circuit $F_i$, a threshold secret sharing of encoding information $e_i$, (i.e., $[e_i]$), and a threshold secret sharing of decoding information $d_i$ (i.e., $[d_i]$) for each sub-function $f_i$

704

Evaluators store the garbled circuit information obtained at 702

706

During an evaluation phase, evaluators receive a function $f$ to be evaluated and represent $f$ as a computation tree that includes the specific sub-functions $f$ is composed of, as well as connections (solder points) between the outputs and inputs of those sub-functions

708

Evaluators evaluate each node/sub-function in the computation tree starting from the lowest level node(s), using the appropriate steps of workflow 600 and a soldering functionality; this results in secure computation of function $f$ as a whole End

*FIG. 7*

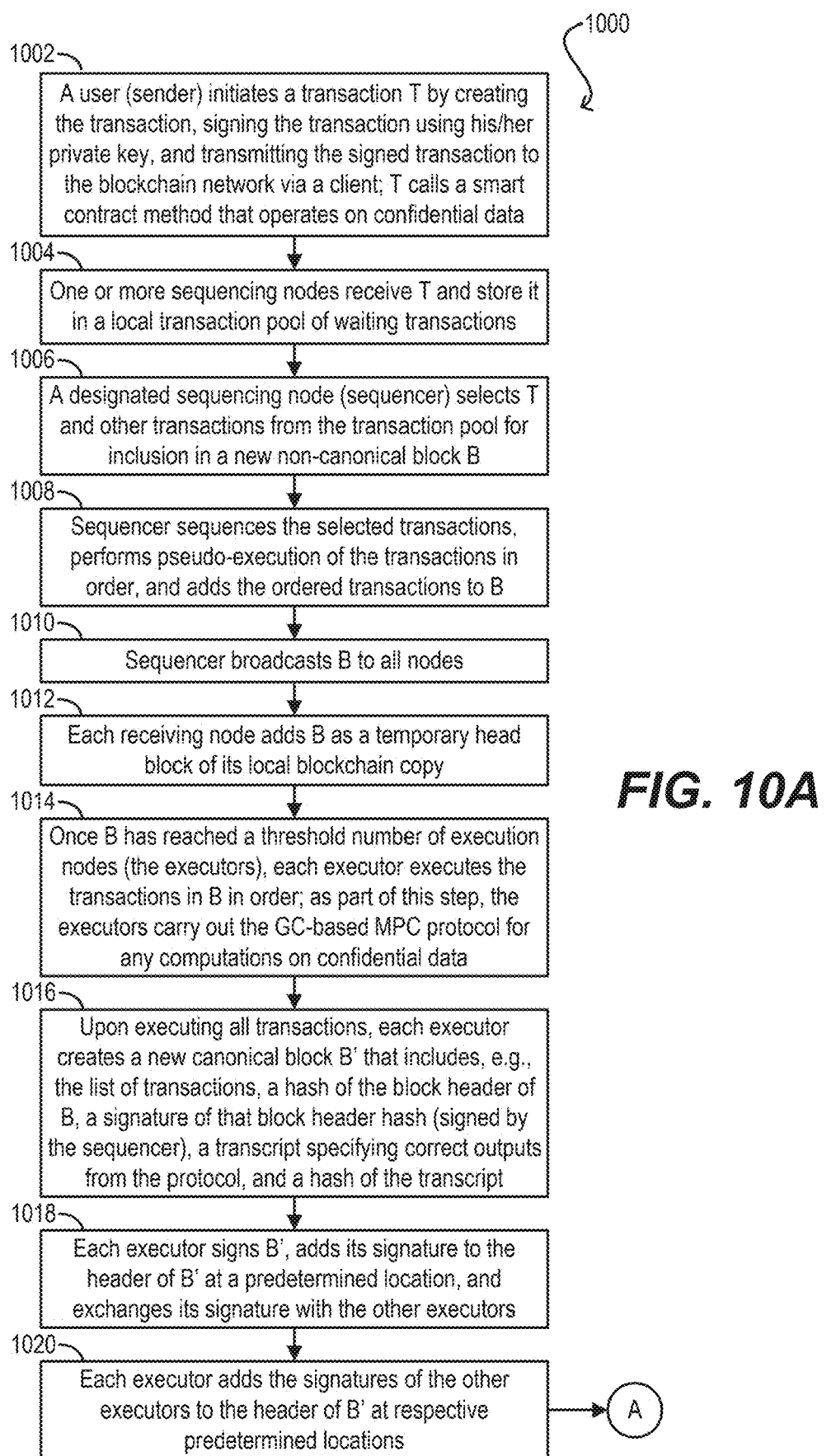

1000

1002 — A user (sender) initiates a transaction T by creating the transaction, signing the transaction using his/her private key, and transmitting the signed transaction to the blockchain network via a client; T calls a smart contract method that operates on confidential data 1004 — One or more sequencing nodes receive T and store it in a local transaction pool of waiting transactions 1006 — A designated sequencing node (sequencer) selects T and other transactions from the transaction pool for inclusion in a new non-canonical block B 1008 — Sequencer sequences the selected transactions, performs pseudo-execution of the transactions in order, and adds the ordered transactions to B 1010 — Sequencer broadcasts B to all nodes 1012 — Each receiving node adds B as a temporary head block of its local blockchain copy 1014 — Once B has reached a threshold number of execution nodes (the executors), each executor executes the transactions in B in order; as part of this step, the executors carry out the GC-based MPC protocol for any computations on confidential data 1016 — Upon executing all transactions, each executor creates a new canonical block B' that includes, e.g., the list of transactions, a hash of the block header of B, a signature of that block header hash (signed by the sequencer), a transcript specifying correct outputs from the protocol, and a hash of the transcript 1018 — Each executor signs B', adds its signature to the header of B' at a predetermined location, and exchanges its signature with the other executors 1020 — Each executor adds the signatures of the other executors to the header of B' at respective predetermined locations

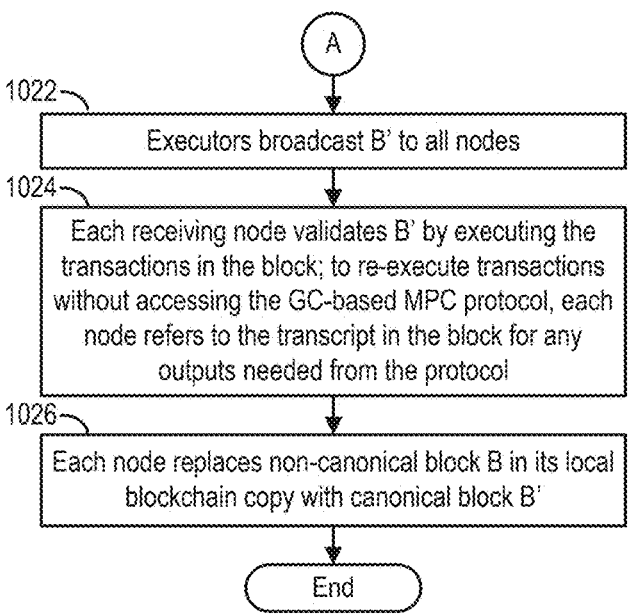

1022 — Executors broadcast B' to all nodes

1024 — Each receiving node validates B' by executing the transactions in the block; to re-execute transactions without accessing the GC-based MPC protocol, each node refers to the transcript in the block for any outputs needed from the protocol 1026 — Each node replaces non-canonical block B in its local blockchain copy with canonical block B'

End

*FIG. 10B*

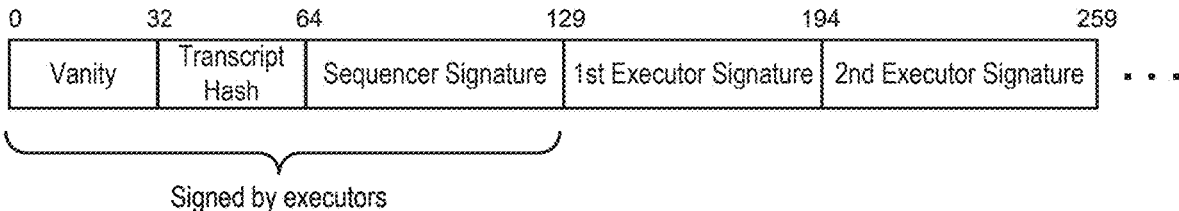

0        32        64        129        194        259

| Vanity | Transcript Hash | Sequencer Signature | 1st Executor Signature | 2nd Executor Signature | . . . |

Signed by executors

*FIG. 11*

ORACLE-DRIVEN BLOCKCHAIN

CROSS-REFERENCES TO RELATED APPLICATIONS

The present application is related to the following commonly-owned U.S. patent applications, filed concurrently herewith:

U.S. patent application Ser. No. 18/738,356 entitled "Garbling Scheme-Based Secure Multiparty Computation (MPC)"; and U.S. patent application Ser. No. 18/738,377 entitled "Protecting Confidential Data in a Blockchain Virtual Machine."

The entire contents of these applications are incorporated herein by reference for all purposes.

BACKGROUND

A blockchain is a distributed ledger of transactions that is maintained by a plurality of nodes in a peer-to-peer computer network, known as a blockchain network. At a high level, a blockchain is structured as a sequence of blocks where each block contains an ordered set of transactions recorded within that block and a cryptographic identifier (hash) of the previous block in the sequence. Because the blocks are cryptographically linked in this manner, an attacker cannot retroactively alter or delete a block without also altering all subsequent blocks in the blockchain (which is practically impossible in large-scale blockchain networks). Accordingly, participants can trust that the transactions recorded in the blockchain are accurate and have not been tampered with, without requiring the involvement of a trusted intermediary.

Some blockchain networks are primarily designed to enable the exchange and storage of a digital currency, known as a cryptocurrency or coin, that is native to the network. For example, the Bitcoin network is designed to enable the exchange/storage of Bitcoin (BTC) and utilizes a blockchain to maintain a distributed, tamper-proof record of BTC transactions. Certain other blockchain networks are primarily designed to enable the deployment and execution of decentralized applications, also known as smart contracts. For example, the Ethereum and Solana networks are two smart contract-based blockchain networks that are designed for this purpose.

A smart contract is a computer program that is deployed on a blockchain network and contains one or more callable functions (methods). These smart contract methods can be called via user-submitted transactions, as well as by other smart contract methods that reside in the same or a different smart contract. Upon being called, the code of a smart contract method is executed by a blockchain network node using a state transition engine, referred to as a blockchain virtual machine (BVM), that runs on the node. For instance, nodes in the Ethereum network run the Ethereum Virtual Machine (EVM) and execute smart contract methods using the EVM.

One of the main obstacles to widespread adoption of existing smart contract-based blockchain networks like the Ethereum network is their lack of confidentiality, or in other words the fact that all data manipulated and maintained by the network is accessible to the public. While this property encourages decentralization by allowing anyone with a computer to join and participate in the network, it also hinders usability and adoption because many real-world activities that can be facilitated by smart contracts deal with confidential information.

BRIEF DESCRIPTION OF THE DRAWINGS

FIG. 3 depicts a transaction processing workflow in the Ethereum network.

FIG. 6 depicts a workflow for implementing a standalone garbling scheme-based secure multi-party computation (MPC) protocol according to certain embodiments.

FIG. 7 depicts a workflow for implementing a stateful garbling scheme-based MPC protocol according to certain embodiments.

FIGS. 10A and 10B depict a transaction processing workflow in the oracle-driven blockchain network of FIG. 9 according to certain embodiments.

FIG. 11 depicts a portion of a header of a canonical block according to certain embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure generally pertain to techniques for implementing on-chain privacy. As used herein, on-chain privacy refers to the ability of a blockchain network, and in particular the BVM running on the nodes of the network, to store and manipulate (e.g., execute smart contract methods on) confidential data without exposing the data in an unauthorized manner.

According to one set of embodiments, a novel secure multi-party computation (MPC) protocol is disclosed that uses a cryptographic primitive known as a garbling scheme. A garbling scheme is used to encrypt a circuit (a representation of a function) and its inputs. Applying a garbling scheme on a circuit results in a garbled circuit (GC). Garbling schemes have conventionally been used to implement secure two-party computation (2PC); the present disclosure goes beyond these conventional techniques by using garbling schemes to implement secure computation by multiple (i.e., any number) of parties. For example, in certain embodiments the garbling scheme-based MPC protocol of the present disclosure (hereinafter referred to as a GC-based MPC protocol) enables a set of N parties (such as nodes in a blockchain network) to execute an arbitrary function (such as a smart contract method) on confidential data, without revealing that confidential data to the parties.

According to another set of embodiments, a novel privacy-preserving BVM is disclosed that leverages the GC-based MPC protocol for smart contract execution and securely manages confidential data that is input to and output by the protocol. This is achieved via new data types and operations for accessing and manipulating confidential data, an authenticated memory, an authenticated storage, and a garbled execution environment.

According to yet another set of embodiments, a novel blockchain network architecture and transaction processing workflow, collectively referred to as the oracle-driven blockchain approach, are disclosed for enabling a blockchain network to efficiently execute and validate transactions that require answers from a blockchain oracle. One example of such a blockchain oracle is the GC-based MPC protocol.

1. Example Blockchain Environment

Figure 1:
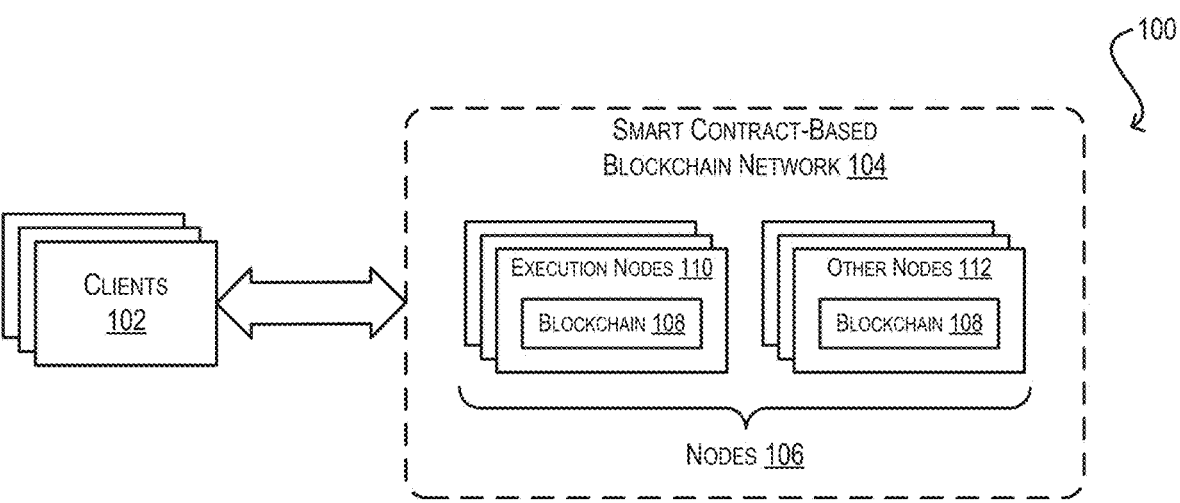
FIG. 1 depicts an example blockchain environment.

To provide context for the various embodiments of the present disclosure, FIG. 1 depicts an example blockchain environment 100 comprising a set of clients 102 connected to a conventional smart contract-based blockchain network 104. For example, blockchain network 104 may be the Ethereum network, the Solana network, or any other similar blockchain network known in the art.

Clients 102 are computer systems/devices that are operated by users of blockchain network 104. These users initiate transactions that are executed by blockchain network 104 and are recorded in the network's blockchain.

Blockchain network 104 is composed of a set of computer systems/devices (nodes) 106 that communicate with each other in a peer-to-peer fashion and participate in maintaining the network's blockchain. Accordingly, each node 106 holds a local copy 108 of the blockchain. A subset of nodes 106, shown as execution nodes 110, are designated to create new blocks, which generally involves selecting transactions (and the order of those transactions) for inclusion in a new block, adding the selected transactions to the new block, executing the transactions in order (thereby causing a state transition in accordance with the transactions), and transmitting the new block to all nodes in the network. The remaining nodes, shown as other nodes 112, do not create new blocks but contribute in other ways to blockchain maintenance. For example, some or all of these other nodes may participate in a consensus mechanism for reaching agreement on the next block to be added to the blockchain and/or may independently validate each such block to ensure its correctness before adding it to its local blockchain copy 108.

Figure 2:
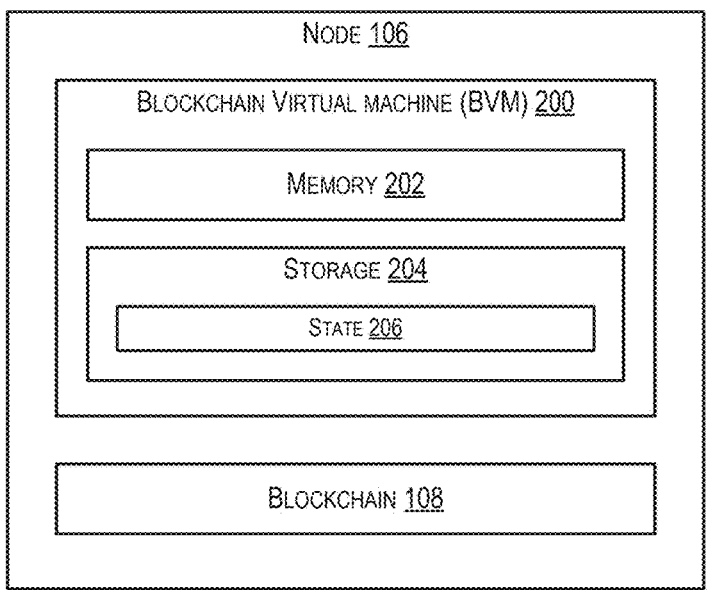
FIG. 2 depicts an example node in a blockchain network.

FIG. 2 depicts a more detailed view of a node 106 of blockchain network 104 according to certain embodiments. Node 106 includes its local copy 108 of the blockchain, as well as a blockchain virtual machine (BVM) 200 comprising a memory 202 and a storage 204. At a high level, BVM 200 is the component of node 106 that is responsible for executing transactions. BVM 200 maintains in its storage 204 state information (hereinafter referred to as simply "state") 206, which is an internal representation of the data that is managed and updated by blockchain network 104. BVM 200 also takes as input an ordered list of transactions that access and/or operate on state 206 and executes the transactions in order. Execution of these transactions may change state 206; accordingly, this execution process is referred to as a state transition function and the BVM itself is referred to as a state transition machine or engine. To provide further context, the following sub-sections detail the structure and operational characteristics of the Ethereum Virtual Machine (EVM), which is one type of blockchain virtual machine that may be represented by BVM 200 of FIG. 2.

1.1 EVM Accounts and State

The state of the EVM is composed of many sub-states, each of which is associated with an external account or an internal account. An external account, also known as an externally owned account or EOA, is an account that may issue (initiate) a transaction and is owned by a user external to the Ethereum network, such as a user operating a client 102 in FIG. 1. Each EOA is associated with an asymmetric public/private key pair for transaction signing and verification purposes; the owner of the EOA uses the private key to sign their transactions and the EVM uses the public key to verify that a signed transaction is authentic and unaltered. The address of an EOA, which is used to uniquely identify the EOA, is its public key.

An internal account, which corresponds to a smart contract, cannot issue transactions and instead can only react to transaction requests initiated by EOAs. Accordingly, an internal account is not associated with a public/private key pair and the address of an internal account is typically a randomly-generated string. The terms "internal account" and "smart contract" are hereinafter used interchangeably.

The sub-state associated with each account includes a balance and a nonce, where the balance refers to the amount of native cryptocurrency (known as Ether or ETH in the Ethereum network) owned by the account and where the nonce refers to the number of transactions the account has issued so far, such that the each newly issued transaction increments the nonce by exactly one. The purpose of this nonce is to protect against replay attacks, or in other words to ensure that no transaction is issued twice. Because smart contracts cannot issue transactions, their nonce is incremented only when they trigger creation of a new smart contract; thus, the nonce of a smart contract simply refers to the number of other smart contracts it has created. In addition to balance and nonce, the sub-state of a smart contract may also include an arbitrary data structure and executable code for a set of smart contract methods. Execution of these methods can change the smart contract's sub-state, such as its balance, nonce, and/or the arbitrary data structure.

1.2 Transactions

Transactions in the Ethereum network can be simple or complex. In a simple transaction, an EOA transfers some amount of ETH to another (external or internal) account. In a complex transaction, an EOA may either create a new smart contract, referred to as smart contract deployment, or call (invoke) a method of an existing smart contract.

In the latter case, the invoked smart contract method may make further calls to the methods of (potentially other) smart contracts, and so on. In this way, a complex transaction initiated by an EOA may trigger a chain reaction that causes changes in multiple EVM sub-states. On the other hand, some complex transactions may cause no change to any sub-state at all. In particular, smart contract methods that are identified as view-methods are guaranteed to never change any sub-state, which implies that they can only call other view-methods. Because view-methods do not result in any sub-state changes, EOAs can call view-methods without authentication (i.e., via unsigned transactions), or in other words via transactions that are not signed using the EOA's private key.

1.3 EVM Execution, Memory, and Storage

Transaction execution in the EVM is fueled by a fee known as gas, which quantifies the computational effort needed for a given transaction. This gas is paid in ETH from the balance of the EOA that initiates the transaction. Each operation executed by the EVM, from arithmetic calculations to data storage, consumes a certain amount of gas; accordingly, the levying of this gas fee incentivizes efficiency and prevents network abuse by bad actors.

For memory management, the EVM uses a volatile memory store (hereafter referred to as simply "memory") that is ephemeral in nature; in other words, the memory is created and used for executing a transaction but is not retained after the execution completes. More specifically, the memory is instantiated as a stack data structure at the start of transaction execution (e.g., the start of a smart contract method), is expanded as needed as execution proceeds, and is wiped clean once the execution is done. This memory is shown as memory 202 in FIG. 2.

For persistent storage, the EVM uses a key-value store (hereinafter referred to as simply "storage") that is persisted between transactions. This storage holds the EVM's state, including the sub-states of all accounts managed by the EVM. In particular, each account sub-state is maintained as an isolated key-value store. This storage is shown as storage 204 in FIG. 2.

When a smart contract method is called that needs data stored in the smart contract's sub-state (e.g., a variable value), the EVM fetches this data from storage and loads it into memory for quick access while executing the method. This is achieved via specific EVM opcodes such as SLOAD, which reads data from the variable's location in storage. After the smart contract method performs computations on or otherwise manipulates the data within memory, there may be a need to persist the data back to storage. In this scenario, the EVM can take the data from memory and write it to storage at its original storage location. This is achieved via specific EVM opcodes such as SSTORE.

1.4 Data Passing between Smart Contracts

The EVM allows a first smart contract to pass data to a second smart contract as part of calling a method in the second smart contract. In particular, when the first smart contract (caller contract) wants to invoke the second smart contract (callee contract), it specifies the callee contract's address and the method to be called, along with any input arguments required by that method. This can be achieved via specific EVM opcodes such as CALL and DELEGATE-CALL. The data passed to the callee contract includes information about the method to be executed (e.g., the method's signature) and the arguments for the method. The callee contract then executes the specified method using the provided arguments. This execution can read from or write to the callee contract's storage, depending on the method's logic, and eventually returns back to the caller contract using the EVM opcode RET. The EVM increments a runtime variable, known as depth, on every method call to a different callee contract and decrements this variable when the method returns to the caller contract.

1.5 End-to-End Transaction Processing in the Ethereum Network

With the foregoing discussion of the EVM in mind, FIG. 3 depicts an example workflow 300 explaining the end-to-end processing of a transaction in blockchain network 104 of FIG. 1, under the assumption that network 104 is the Ethereum network and the BVM running on each node 106 of network 104 is the EVM. While workflow 300 is specific to the Ethereum network, similar workflows will apply to other smart contract-based blockchain networks such as Solana and the like.

Starting with step 302, a user (sender) operating a client 102 initiates a transaction T by creating the transaction, signing the transaction using his/her private key, and transmitting the signed transaction to nodes 106 of blockchain network 104 via client 102. In the case of a simple transaction that transfers some amount of native coin (e.g., ETH) from the sender to a recipient, the transaction will include, among other things, the sender's address (public key), the sender's nonce, the recipient's address, the amount of native coin to be transferred, and a gas limit indicating the per-unit gas price the sender is willing to pay to execute the transaction. In the case of a complex transaction (i.e., the invocation of a smart contract method), the transaction will include, among other things, the sender's address, the sender's nonce, the smart contract address, the method to be called, the arguments for the method, and the gas limit.

At step 304, one or more nodes 106 receive transaction T and temporarily store it in a local transaction pool of waiting (i.e., not yet executed) transactions, also known as the mempool. Prior to adding transaction T to its mempool, the BVM of each receiving node performs a set of initial validations on T to ensure that it is a correctly-formed transaction. For example, the BVM will verify the transaction signature, verify the nonce, and check for a sufficient balance in the sender account (in the case of a coin transfer). The BVM will also simulate an execution of the transaction to estimate the gas needed and to check for execution errors or exceptions.

At step 306, an execution node 110 selects transaction T from its mempool, along with one or more other transactions, for inclusion in a new block B. The execution node uses various criteria for performing this selection, such as the amount of profit (also known as "tip") that will be collected for each transaction. The execution node then sequences the selected transactions according to some order, executes the transactions in order using its BVM, possibly resulting in changes to the BVM's state (and in particular, to the sub-states of the accounts that are affected by the transaction), adds the ordered transactions (along with other relevant information) to B, and broadcasts B to all nodes 106 in the network (step 308). For example, the following is a non-exhaustive list of data that may be included in new block B at the end of step 308:

A block header that comprises, among other things, a hash of the header of the previous (head) block in the blockchain and a hash of the BVM's current state (after transaction execution);

an ordered list of transactions that includes, for each transaction, the sender's address, the recipient's address (or smart contract address), the sender's nonce, the amount of native coin transferred (in the case of a simple transaction), arguments for the invoked smart contract method (in the case of a complex transaction), etc.; and a transaction receipt for each transaction that includes logs or status information regarding the transaction (e.g., success, failure, etc.).

Note that steps 306 and 308 may be performed independently and in parallel by multiple execution nodes 110, potentially resulting in multiple (proposed) new blocks that are broadcast to all nodes 106.

At step 310, the nodes that receive new block B (as well as possibly other new blocks created by other execution nodes) carry out a consensus protocol to agree on a single new block as the next block to be added to the network's blockchain. In the original version of the Ethereum network (Ethereum 1.0), this consensus protocol was based on a Proof-of-Work (PoW) mechanism. In the current version of the Ethereum network (Ethereum 2.0), this consensus protocol is based on a Proof-of-Stake (PoS) mechanism. For the purposes of workflow 300, it is assumed that the nodes agree on new block B as being the next block to be added.

Finally, at step 312, each node 106 that receives new block B performs a final validation of the block and subsequently adds it to the node's local blockchain copy 108, thereby extending the blockchain. The final validation performed at step 316 includes executing the transactions recorded in the block to verify that the transactions were executed correctly by the block creator and to bring the current node to the same state. Although not shown in the workflow, each node can also propagate the validated block to other nodes in the network, thereby ensuring that the block eventually reaches all nodes.

2. Solution Overview

As mentioned in the Background section, one of the most controversial properties of current smart contract-based blockchain networks like the Ethereum network is that everything on the network is public. This means that the sub-states of all accounts (both EOAs and smart contracts deployed on the network), which may include financial, social, or other types of sensitive information, are visible to all.

While such transparency played a key role in the decentralization of the Ethereum network and other similar networks, it poses a significant problem for the usability and adoption of smart contract-based blockchain networks moving forward. For example, a prominent use case of the Ethereum network has been decentralized finance (de-fi), which paved the way for collaborative liquidity pools and automatic movement of funds. However, in many cases de-fi is used by bad actors for scams (e.g., rug pulls) and fraud (e.g., money laundering). Arguably, one of the reasons for this is the network's lack of confidentiality, which prevents honest actors from proving and verifying each other's identity and thus renders them more vulnerable to exploits and manipulation. Further, lack of confidentiality is an obstacle to using smart contract-based blockchain networks for purposes that have real social impact, as most real-world social activities deal with private information that must be handled accordingly. For example, an election usually requires the vote submitted by each voter to be kept secret in order to ensure independence of votes and to enable the voters to vote in accordance with their opinions/beliefs without fearing consequences. As another example, a sealed bid auction requires independence of bids as well as their confidentiality, because revealing such bid information may expose a bidder's sensitive financial state.

Figure 4:
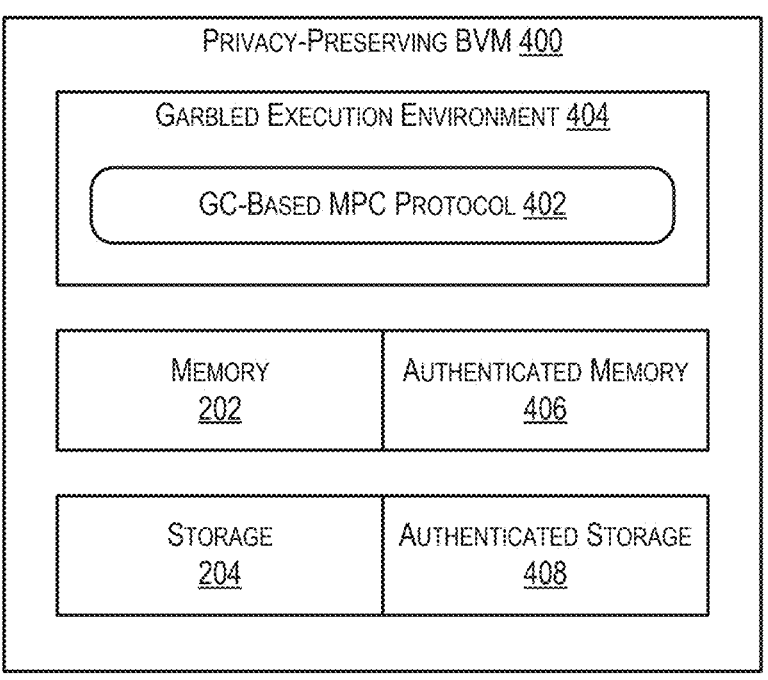
FIG. 4 depicts a privacy-preserving blockchain virtual machine (BVM) according to certain embodiments.

To address the foregoing and other similar and/or related issues, FIG. 4 depicts a novel privacy-preserving BVM 400 that can be used by nodes 106 of blockchain network 104 of FIG. 1 according to certain embodiments. At a high level, the use of privacy-preserving BVM 400 by the nodes of blockchain network 104 enables the network to achieve on-chain privacy, or in other words the ability to keep certain pieces of data maintained and manipulated by the network private/secret, rather than visible to all. In one set of embodiments, privacy-preserving BVM 400 may be an entirely new blockchain virtual machine that is unrelated to existing blockchain virtual machines known in the art. In other embodiments, privacy-preserving BVM 400 may be a modified version of an existing BVM, such as the EVM, that has been enhanced in accordance with the techniques of the present disclosure to support on-chain privacy.

As shown in FIG. 4, privacy-preserving BVM 400 includes, in addition to memory 202 and storage 204 mentioned previously, the following new components: a garbled circuit (GC)-based MPC protocol 402 running within a garbled execution environment 404, an authenticated memory 406, and an authenticated storage 408. GC-based MPC protocol 402 is a cryptographic protocol that is executed in a distributed manner across some (or all) of the blockchain network nodes and enables those nodes to execute arbitrary functions (e.g., smart contract methods) on confidential data, without revealing that confidential data to each other. In certain embodiments, GC-based MPC protocol 402 may only be present or executable on a designated subset of nodes in the network, such as execution nodes 110 shown in FIG. 1.

Authenticated memory 406, authenticated storage 408, and garbled execution environment 404 are components that allow privacy-preserving BVM 400 to ensure the security of confidential data that is stored and operated on by the BVM, including data that is passed as input to, and received as output from, GC-based MPC protocol 402. The design of these components is closely tied to new data types that privacy-preserving BVM 400 uses for representing confidential data and new operations that the BVM performs on such data types to prevent malicious manipulation and unauthorized acquisition.

The remaining sections of the present disclosure describe GC-based MPC protocol 402 and the features/operation of privacy-preserving BVM 400 in greater detail, including how the BVM leverages authenticated memory 406, authenticated storage 408, and garbled execution environment 404 to implement appropriate access control over confidential data. In addition, a novel oracle-driven blockchain approach is described that facilitates block creation and transaction execution/validation in scenarios where the transactions are dependent on answers from a blockchain oracle. The relevance of this oracle-driven blockchain approach to the foregoing on-chain privacy solution is that GC-based MPC protocol 402 can be considered a blockchain oracle due to the way in which it manipulates and outputs confidential (garbled) data in a black-box fashion. Accordingly, the oracle-driven approach can be used to facilitate block creation and transaction execution/validation in a blockchain network that employs GC-based MPC protocol 402 as an oracle (as well as in any other blockchain network that relies on any other type of blockchain oracle).

It should be appreciated that the depictions of blockchain environment 100, node 106, and BVM 400 in FIGS. 1, 2, and 4 respectively are illustrative and not intended to limit embodiments of the present disclosure. For example, while each of these figures depict a particular arrangement of components or entities, other arrangements are possible (e.g., the functionality attributed to a particular component or entity may be split into multiple components/entities, certain components/entities may be combined or integrated into other components/entities, and so on). One of ordinary skill in the art will recognize other variations, modifications, and alternatives.

3. GC-Based MPC Protocol

An MPC protocol is a cryptographic protocol that allows multiple (i.e., two or more) parties to jointly execute (evaluate) a function over a set of private inputs while maintaining the privacy of those inputs. The GC-based MPC protocol of the present disclosure as shown in FIG. 4 is a novel MPC protocol that leverages a cryptographic primitive known as a garbling scheme to achieve this goal.

Sections 3.1 and 3.2 below present an overview of circuits, garbling schemes, and garbled circuits to provide context for the GC-based MPC protocol. Section 3.3 then presents the details of this protocol, including a version of the protocol that can efficiently evaluate an arbitrary future function, or in other words an arbitrary function that is only made known to the protocol participants in real-time (i.e., at the time execution of the function is needed).

3.1 Circuits

A circuit is a mathematical representation of a function that is composed of a set of gates coupled via wires. Assuming a fan-in of two (i.e., two inputs per gate), each gate is a function $G(x, y) \rightarrow z$ where x and y are values carried on the gate's incoming wires and z is a value carried on the gate's outgoing wire. The domain of values that each wire can carry is typically defined by a finite field, group, or ring. In many cases this domain is $\{0,1\}$, which means that each gate is a Boolean function such as logical AND, logical OR, or logical XOR and the circuit overall is a Boolean circuit. The input to a circuit is the set of values carried over the wires that are not output by any gate of the circuit (referred to as the circuit's input wires) and the output of a circuit is the set of values carried over the wires that are not used as input to any gate of the circuit (referred to as the circuit's output wires).

Figure 5:
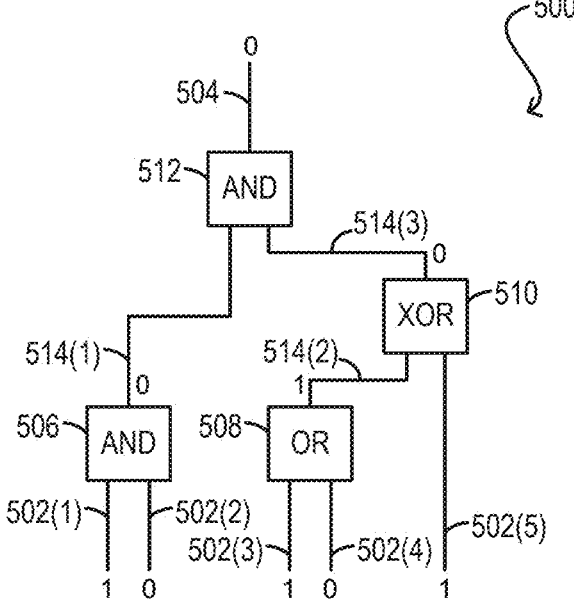
FIG. 5 depicts an example circuit.

By way of example, FIG. 5 depicts a simple Boolean circuit 500 comprising five input wires 502(1)-(5), one output wire 504, and four gates 506-112 (AND gate 506, OR gate 508, XOR gate 510, and AND gate 512) that are interconnected via intermediary wires 514(1)-(3). In this example, the bit string "10101" is provided as input to Boolean circuit 500 over input wires 502(1)-(5), which causes the circuit to output the bit string "0" over output wire 504 in accordance with the circuit's structure.

Stated more formally, a circuit is a six-tuple $f=(n, m, q, A, B, G)$ where $n \geq 2$ is the number of input wires, $m \geq 1$ is the number of output wires, and $q \geq 1$ is the number of gates. The circuit's input wires (collectively referred to as Inputs), total wires (collectively referred to as Wires), output wires (collectively referred to as Outputs), and gates (collectively referred to as Gates) are indexed as follows: Inputs= $\{1, \ldots, n\}$, Wires=$\{1, \ldots, n+q\}$, Outputs=$\{n+q-m+1, \ldots, n+q\}$, Gates=$\{n+1, \ldots, n+q\}$. Further, the functions A and B are of the form Gates$\rightarrow$Wires\Outputs where $A(g)$ (or $B(g)$ respectively) returns the first/left (or second/right respectively) incoming wire of gate g, and the function G is of the form Gates$\times V^2 \rightarrow V$ where V is the domain of values that the wires can carry. This definition assumes the following:

Gates have a fan-in of two, arbitrary functionality, and arbitrary fan-out (in other words, an output wire may serve as an incoming wire to an unlimited number of gates);

every non-input wire is the outgoing wire of some gate;

the i-th value of the circuit's input is presented on wire i;

the i-th value of the circuit's output is collected off of wire $n+q-m+i$;

the index of the outgoing wire of each gate serves as the index of that gate;

output wires may not be input wires and may not be incoming wires to gates;

no output wire may be twice used in the output; and $A(g)<B(g)<g$ (this ensures that the directed graph corresponding to circuit f is acyclic and that the numbering of gates comprises a topological sort).

Given the foregoing definition, the canonical evaluation function $ev_{circ}$ for executing (evaluating) a circuit is presented below. This function takes a circuit f and a list of inputs $x=x_1,x_2, \ldots, x_n$ and returns a list of outputs $x_{n+q-m+1}, \ldots, x_{n+q}$.

| | Listing 1 |
|---|---|
| 1: | $ev_{circ}(f,x)$   { |
| 2: | $(n,n,q,A,B,G) \leftarrow f$ |
| 3: | for $g \leftarrow n + 1$ to $g \leftarrow n + q$ do |
| 4: | $a \leftarrow A(g)$ and $b \leftarrow B(g)$ |
| 5: | $x_g \leftarrow G(g,x_a,x_b)$ |
| 6: | end for |
| 7: | return $x_{n+q-m+1}, \ldots ,x_{n+q}$ |
| 8: | } |

3.2 Garbling Schemes and Garbled Circuits

A garbled circuit is an encrypted, or "garbled," version of a circuit that is created and manipulated using a garbling scheme $\mathcal{G}$ comprising a four-tuple of algorithms (Gb, En, Ev, De). Let $f(n, m, q, A, B, G)$ be a circuit that we wish to garble; recall that f represents a function of the form $V^n \rightarrow V^m$. The algorithms of garbling scheme $\mathcal{G}$ are defined as follows:

Gb($1^\kappa$,f)$\rightarrow$F, e, d—This is a "garble" algorithm that takes circuit f and a computational security parameter $\kappa$ and returns a garbled circuit F, encoding information e, and decoding information d. In a projective garbling scheme, encoding information e is a vector of n label sets where label set $L_i$ is associated with the i-th input wire or output wire (i $\varepsilon$ {1, . . . , n} $\cup$ {n+q-m+1, . . . , n+q}). For example, if circuit f is a Boolean circuit such that V={0,1}, there will two labels in label set $L_i$ for the i-th input wire, namely $$\{L_i^0, L_i^1\}.$$

Label $$L_i^0$$

is a randomly-selected value/string that represents a bit value of "0" over the i-th input wire and the label $$L_i^1$$

is a randomly-selected value/string that represents a bit value of "1" over the i-th input wire.

En(e,x)$\rightarrow$X—This is an "encode" algorithm that takes encoding information e and an input $x=x_1,x_2, \ldots, x_n$ to circuit f and returns a garbled input X. Assuming encoding information e is a vector of n label sets $(L_1, \ldots, L_n)$ as mentioned above, garbled input X will be a vector of n labels that are selected from encoding information e using the values $x=x_1,x_2, \ldots, x_n$. For example, for a Boolean circuit, the i-th label in garbled input X will be either the "zero label"

$$(i.e., L_i^0)$$

or the "one label"

$$(i.e., L_i^1)$$

for $x_i$ as defined in encoding information e, based on the bit value of $x_i$ (zero or one); in other words, X=

$$\left(L_1^{x_1}, L_2^{x_2}, \ldots, L_n^{x_n}\right).$$

X is referred to as a garbled input because it hides the true values in input x by replacing them with their corresponding labels.

Ev(F,X)→Y—This is an "evaluate" algorithm that takes garbled circuit F and garbled input X and returns a garbled output Y indicating the result of evaluating F using X.

De(Y,d)→y—This is a "decode" algorithm that takes garbled output Y and decoding information d and returns a final output $y \in V^m$.

Garbling schemes provide various security guarantees such as privacy, obliviousness, authenticity, and more; for the purposes of this disclosure, garbling scheme $\mathcal{G}$ defined above is assumed to provide privacy and authenticity. At a high level, privacy means that a party that is given garbled circuit F and garbled input X and executes the Ev and/or De algorithms to obtain final output y will not learn anything other than y. For example, the party will not learn anything regarding the original input $x=x_1, x_2, \ldots, x_n$. Authenticity means that a party cannot produce a garbled output Y' that is different from the correct garbled output Y that is obtained through honest evaluation of garbled circuit F.

3.3 General MPC Using Garbling Schemes

Garbling schemes have conventionally been used to implement secure two-party computation, which is the secure computation of a function between exactly two parties where each party holds a part of the input that is private to that party. In contrast to those conventional approaches, the GC-based MPC protocol of the present disclosure enables secure computation among more than two parties, where the private inputs may not be owned by those parties. Accordingly, the protocol can be executed by the nodes in a blockchain network to securely execute a smart contract method that operates on data that is provided by, and is private to, an external user (e.g., a user that owns an EOA).

Two versions of the GC-based MPC protocol are presented below: a "standalone" version that allows for secure computation of a function $f$ that is known to the parties ahead of time, and a "stateful" version that allows for secure computation of an arbitrary future function $f$ that is not known to the parties at the time of garbling (or in other words, only becomes known at the time the function needs to be evaluated). This stateful version enables the protocol to be used in the context of a runtime execution environment such as privacy-preserving BVM 400 of FIG. 4 where the functions (e.g., smart contract methods) that are executed within the environment are known only in real-time.

In both the standalone and stateful versions, the parties involved in the protocol are denoted by $\mathcal{P} = \{P_1, \ldots, P_N\}$ and include two (potentially overlapping) sets referred to as garblers and evaluators. For example, the evaluators may correspond to execution nodes 110 in blockchain network 104 of FIG. 1 and the garblers may correspond to a combination of execution nodes 110 and/or other nodes 112 (or in some cases, may corresponding to entities that are completely external to blockchain network 104). It is assumed that an adversary may corrupt at most $t_G < |garblers|$ parties of the garblers and at most $t_E < |evaluators|$ parties of the evaluators. A corrupted party $P_i$ that is both a garbler and an evaluator contributes to both $t_G$ and $t_E$.

Further, both the stand-alone and stateful versions of the GC-based MPC protocol make use of three internal MPC protocols; these internal protocols may be instantiated with any MPC construction known in the art (e.g., those based on secret sharing techniques, other garbling schemes, homomorphic encryption, etc.). The functionalities realized by the internal protocols are referred to as $\mathcal{F}_{Gb}$ (the garbling functionality), $\mathcal{F}_{En}$ (the encoding functionality), and $\mathcal{F}_{De}$ (the decoding functionality) and are summarized in Listings 2, 3, and 4 below. Note that for some data structure (e.g., vector, list key-value store, etc.) x, [x] denotes the result of a threshold secret sharing of x, where each receiver obtains only a share of x. These shares are also known as secret shares because they are designed such that no unqualified group of receivers can learn anything regarding x solely from their individual shares; however, x can be reconstructed if a sufficient (e.g., above a predefined threshold) number of receivers combine their shares.

---

Listing 2

Garbling Functionality $\mathcal{F}_{Gb}^{\kappa,\mathcal{G}}$

Parties: This functionality interacts with the garblers and the evaluators.
Parameters: A computational security parameter κ and a garbling scheme $\mathcal{G} = (Gb, En, Ev, De)$.
1: Upon receiving (garble, f) from the garblers, compute (F, e, d) ← Gb(1$^\kappa$, f),
2: Return F, [e], and [d] to the evaluators,

---

Listing 3

Encoding Functionality $\mathcal{F}_{En}^{\kappa,\mathcal{G}}$

Parties: This functionality interacts with the evaluators.
Inputs: The evaluators have a threshold secret sharing of encoding information e, namely [e].
In addition, for each input wire $i \in \{1, \ldots, n\}$, the evaluators either known the public input $x_i$ or have a secret sharing of it, namely $[x_i]$. Let PublicIdx, PrivateIdx $\subseteq \{1, \ldots, n\}$ be the indices of the wires for which the input is public and private respectively, then PublicIdx $\cap$ PrivateIdx = $\emptyset$. Let $x = (x_1, x_2, \ldots, x_n)$.
Parameters: $\mathcal{G} = (Gb, En, Ev, De)$.

-continued

---
Listing 3
---

1: Upon receiving (encode, [e], (x'$_1$, . . . , x'$_n$)) from the evaluators where x'$_i$ = x$_i$ if i ∈ PublicIdx and x'$_i${ = [x$_i$] if i ∈ PrivateIdx, reconstruct e and x$_i$ for all i E PrivateIdx and compute X = En(e, x).
2: Return X to the evaluators.

---

---
Listing 4
---

Decoding Functionality $\mathcal{F}_{De}^{\kappa,\mathcal{G}}$

Parties: This functionality interacts with the evaluators.
Inputs: The evaluators have a garbled output Y. The evaluators also have a secret sharing of decoding information d, namely [d].
Parameters: $\mathcal{G}$ = (Gb, En, Ev, De).
1: Upon receiving (decode, [d], Y) from the evaluators, reconstruct d and compute y = De(d, Y).
2: Return y to the evaluators.

---

3.3.1 Standalone GC-Based MPC Protocol

FIG. 6 depicts a workflow 600 that may be performed by parties $\mathcal{P}$ ={P$_1$, . . . , P$_N$} (which includes both the garblers and evaluators) for implementing the standalone GC-based MPC protocol according to certain embodiments. The term "standalone" refers to the fact that the function (circuit) to be evaluated via the protocol (i.e., function $f$) is complete and known to the parties ahead of time. Workflow 600 assumes that x=(x$_1$,x$_2$, . . . , x$_n$) is the input to $f$ and for each input wire i ε {1, . . . , n}, the evaluators either known the public input x$_i$ or have a secret sharing of it, namely [x$_i$]. PublicIdx, PrivateIdx ⊆ {1, . . . , n} are the indices of the wires for which the input is public and private respectively.

Starting with step 602, the garblers can send the garble command (garble, $f$) to garbling functionality $$\mathcal{F}_{Gb}^{\kappa,\mathcal{G}},$$

which causes each evaluator to obtain garbled circuit F, a share of the threshold secret sharing of encoding information e (i.e., [e]), and a share of the threshold secret sharing of decoding information d (i.e., [d]).

At step 604, the evaluators can send the encode command (encode, [e], (x'$_1$, . . . , x'$_n$)) to encoding functionality $$\mathcal{F}_{En}^{\kappa,\mathcal{G}},$$

which causes the evaluators to obtain garbled input X. As part of this step, each evaluator can provide to $$\mathcal{F}_{En}^{\kappa,\mathcal{G}}$$

its share of [e] and, for each x'$_i$, either x$_i$ (if i ε PublicIdx) or its share of [x$_i$] (if i ε PrivateIdx).

At step 606, each evaluator can locally compute Ev(F,X) (or in other words, evaluate garbled circuit F using garbled input X), which causes the evaluator to obtain garbled output Y.

Finally, at step 608, the evaluators can send the decode command (decode, [d], Y) to decoding functionality $$\mathcal{F}_{De}^{\kappa,\mathcal{G}},$$

which causes the evaluators to obtain final output y.

3.3.2 Stateful GC-Based MPC Protocol

FIG. 7 depicts a workflow 700 that may be performed by parties $\mathcal{P}$ ={P$_1$, . . . , P$_N$} (which includes both the garblers and evaluators) for implementing the stateful GC-based MPC protocol according to certain embodiments. Like workflow 600, this workflow assumes that x=(x$_1$,x$_2$, . . . , x$_n$) is the input to the function (circuit) $f$ to be evaluated and, for each input wire i ε {1, . . . , n}, the evaluators either know the public input x$_i$ or have a secret sharing of it, namely [x$_i$]. PublicIdx, PrivateIdx ⊆={1, . . . , n} are the indices of the wires for which the input is public and private respectively. However, unlike workflow 600, workflow 700 further assumes that function $f$ is a future function that is unknown to the parties ahead of time (or in other words, prior to the time at which it needs to be evaluated), and $f$ is composed of a number of smaller functions (i.e., sub-functions) from a known set of sub-functions $f_1$, . . . , $f_k$. For example, function $f$ may be a computer program (e.g., a smart contract method) that is composed of instructions/operations in a known programming language (e.g., opcodes in an assembly language executable by a BVM). The term "stateful" refers to the computation of these sub-functions and, at a later time, combining the sub-functions in order to compute future function $f$ (i.e., when $f$ becomes known to the parties).

To efficiently evaluate such a future function $f$, the stateful protocol embodied by workflow 700 involves two phases: an offline/preprocessing phase and an evaluation phase. During the offline/preprocessing phase, the garblers produce garbled circuits and associated encoding and decoding information for each sub-function in the known set of sub-functions. During the evaluation phase, the evaluators evaluate $f$ by evaluating each of the sub-functions of $f$ using their respective garbled circuits and "soldering" together the outputs and inputs of the circuits as needed. This soldering is achieved via an additional internal MPC protocol referred to as soldering functionality $$\mathcal{F}_{Solder}^{G}$$

that takes as input two garbled circuits $(F_1,[e_1],[d_1])$ and $(F_2,[e_2],[d_2])$ and a set of indices $I_1$ and $I_2$, such that outputs wires with indices $I_1$ of the first garbled circuit should be soldered (connected) to input wires with indices $I_2$ of the second garbled circuit. Given these inputs, $$\mathcal{F}_{Solder}^{G}$$

returns some (public) information that tells the evaluators how to, at the time of evaluation, translate the garbled output received on each output wire in $I_1$ into a garbled input for the corresponding input wire in $I_2$.

For example, assume output wire $w_1$ of garbled circuit $F_1$ should be soldered to input wire $w_2$ of garbled circuit $F_2$ and the circuits are Boolean circuits (which means the wires are associated with two labels: a first label that represents the value 0 and a second label that represents the value 1). Let the labels associated with $w_1$ and $w_2$ be $$\left(L_{w_1}^{0}, L_{w_1}^{1}\right)$$

and $$\left(L_{w_2}^{0}, L_{w_2}^{1}\right)$$

respectively. In this scenario, the soldering functionality $$\mathcal{F}_{Solder}^{G}$$

can return a value $\delta_{w_{1,2}}$ such that Solder $$\left(L_{w_1}^{0}, \delta_{w_{1,2}}\right) = L_{w_2}^{0} \text{ and } \text{Solder}\left(L_{w_1}^{1}, \delta_{w_{1,2}}\right) = L_{w_2}^{1}$$

(where Solder is the translation procedure).

Turning now to step 702 of the workflow, during the offline/preprocessing phase, the garblers can send to garbling functionality $$\mathcal{F}_{Gb}^{\kappa,G}$$

the garble command (garble, $f_i$) for each sub-function $f_i$ in the known set of sub-functions $f_1, \ldots, f_k$, which causes each evaluator to obtain a garbled circuit $F_i$, a share of the threshold secret sharing of encoding information $e_i$ (i.e., $[e_i]$), and a share of the threshold secret sharing of decoding information $d_i$ (i.e., $[e_i]$) for $f_i$. At step 702, the evaluators can store this garbled circuit information for the sub-functions.

Then, during the evaluation phase, the evaluators can receive function $f$ and represent $f$ as a computation tree that includes the specific sub-functions that $f$ is composed of and connections (solder points) between the outputs and inputs of those sub-functions (step 706). For example, assume input x comprises four input wires $(x_1,x_2,x_3,x_4)$ and $f=(x_1+x_2)\cdot(x_3+x_4)$. In this case, the computation tree that the evaluators build at step 606 will have four leaves at level 0 corresponding to the four input wires $(x_1,x_2,x_3,x_4)$; two ADD nodes at level 1 that receive input wires $x_1,x_2$ and $x_3,x_4$ respectively; and one MULTIPLY node at level 2 with input wires that are soldered to the output wires of the two ADD nodes at level 1.

Finally, the evaluators can evaluate each node/sub-function in the tree starting with the lowest level node(s), using the appropriate steps of workflow 600 and the soldering functionality mentioned above, thereby evaluating function $f$ as a whole (step 708). For instance, in the previous example where $f=(x_1+x_2)\cdot(x_3+x_4)$ the evaluators can perform the following as part of step 708:

1. Retrieve from storage the garbled circuit for the ADD sub-function $(F_{ADD})$, the threshold secret sharing $[e_{ADD}]$ of the encoding information for $F_{ADD}$, and the threshold secret sharing $[d_{ADD}]$ of the decoding information for $F_{ADD}$;
2. send the encode command (encode, $[e]$, $(x'_1,x'_2)$) to encoding functionality $$\mathcal{F}_{En}^{\kappa,G},$$

resulting in garbled input $X_{ADD1}$ for the first ADD node;

$$\mathcal{F}_{En}^{\kappa,G},$$

3. send the encode command (encode, $[e]$, $(x'_3,x'_4)$) to encoding functionality resulting in garbled input $X_{ADD2}$ for the second ADD node;
4. locally compute $\text{Ev}(F_{ADD},X_{ADD1})$, resulting in garbled output $Y_{ADD1}$ for the first ADD node;
5. locally compute $\text{Ev}(F_{ADD},X_{ADD2})$, resulting in garbled output $Y_{ADD2}$ for the second ADD node;
6. retrieve from storage the garbled circuit for the MULTIPLY sub-function $(F_{MULTIPLY})$, the threshold secret sharing $[e_{MULTIPLY}]$ of the encoding information for $F_{MULTIPLY}$, and the threshold secret sharing $[d_{MULTIPLY}]$ of the decoding information for $F_{MULTIPLY}$;
7. invoke the soldering functionality $$\mathcal{F}_{Solder}^{G}$$

to translate garbled outputs $Y_{ADD1}$ and $Y_{ADD2}$ into the appropriate garbled input $X_{MULTIPLY}$ for the MULTIPLY node;
8. locally compute $\text{Ev}(F_{MULTIPLY},X_{MULTIPLY})$, resulting in garbled output $Y_{MULTIPLY}$ for the MULTIPLY node; and
9. send the decode command (decode, $[d_{MULTIPLY}]$, $Y_{MULTIPLY}$) to decoding functionality $$\mathcal{F}_{De}^{\kappa,G},$$

resulting in final output y for function f.

4. Features and Operation of the Privacy-Preserving BVM

While the stateful version of the GC-based MPC protocol described above allows nodes in a blockchain network to execute smart contract methods on confidential data in a manner that does not reveal that data to the nodes, this protocol alone is not sufficient to implement a comprehensive on-chain privacy solution. For example, it is important to protect such confidential data from being maliciously copied (for use in, e.g., replay attacks) or being acquired by unauthorized entities outside of transaction execution.

To address this, the privacy-preserving BVM of the present disclosure implements the following features for supporting confidentiality according to certain embodiments: (1) new sets of "secret" data types that are designed to hold and secure confidential data that is at rest (i.e., maintained in BVM storage or memory), in transit (i.e., received from external clients), and in use (i.e., actively used by the GC-based MPC protocol); (2) new security metadata (keys) for encrypting and decrypting some of these secret data types; (3) new components/mechanisms for applying access controls over the secure data types (i.e., authenticated memory 406, authenticated storage 408, and garbled execution environment 404 shown in FIG. 4); and (4) new rules and operations for implementing the access controls. Each of these features is described in turn below.

4.1 Secret Data Types

All information in the BVM sub-state of an account (including the balance, nonce, and anything residing in the arbitrary data structure maintained by smart contracts) is generally stored as atomic typed variables, or in other words as variables that capture a certain type of data such as signed or unsigned integers, strings, bytes, etc. Let Types by the set of data types supported by a conventional BVM like the EVM. The data types in Types are referred to as plaintext or PT because they are not secured in any fashion.

To support confidentiality, the privacy-preserving BVM of the present disclosure implements three new sets of secret data types that are analogous to Types: ciphertext (denoted as CT), inputtext (denoted as IT), and garbledtext (denoted at GT). For example, if Types includes data types such as uint8, uint32, suint64, and so on, each of ciphertext, inputtext, and garbledtext will have corresponding data types with the same name but prepended with either ct, it, or gt respectively. Generally speaking, smart contract developers must use these new secure data types in their smart contracts if they wish the underlying information to remain secret.

4.1.1 Ciphertext

Ciphertext (CT) is used for securing/protecting confidential data at rest, or in other words data that is maintained in BVM memory or storage. This is the set of secret data types that is actually visible in the BVM's state. Each CT instance holds data in an encrypted format; for example, in certain embodiments each CT instance may hold the result of a chosen plaintext attack (CPA)-secure encryption scheme such as AES128 in counter (CTR) mode. As explained in further detail below, some instances of CT will be encrypted using a symmetric key assigned to the blockchain network while other instances of CT (i.e., inputtext) will be encrypted using a user key.

4.1.2 Inputtext

Inputtext (IT) is a wrapper of CT and is used for securing/protecting confidential data that enters the BVM from the outside world, such as confidential data submitted by a user as an argument to a smart contract method. The main purpose of IT is to ensure that the wrapped CT will be used only in the context of the transaction it is submitted for and cannot be re-used in other transactions (by malicious actors). For example, if a user participates in a sealed bid auction and sends a CT instance in a transaction that hides his/her plaintext bid, an adversary should not be able to copy that user's CT instance and submit it as his/her own bid. More generally, the adversary should be prevented from reusing the CT instance in any way, or in other words the BVM should not agree to perform any secure operation on it.

To achieve this, each IT instance is a CT instance and associated transaction details (e.g., sender address, smart contract address, and called method) that are signed by the user submitting the CT instance as part of a transaction, using the user's private signing key. Upon receiving an IT instance, the privacy-preserving BVM of the present disclosure can validate the signature via the user's corresponding public key to ensure that the included CT instance and transaction details are authentic and match the current transaction. If this validation is successful, the BVM can agree to operate on the CT instance (e.g., use it as input to a secure computation performed via the GC-based MPC protocol). If the validation is unsuccessful, the BVM can throw an error or otherwise refrain from using the CT instance in any manner.

4.1.3 Garbledtext

Garbledtext (GT) is used for protecting/securing confidential data that is in use, or in other words data that is manipulated by the GC-based MPC protocol. Using a binary-projective garbling scheme, the garbledtext version of a message $m=(m_1, \ldots, m_j)$ where $m_i \in \{0,1\}$ is gt of type GT such that $gt=(L_1, \ldots, L_j)$, where each L is a $\kappa$-bit label (typically $\kappa=128$). With this construction, a GT instance expands the underlying data by a factor of $\kappa$; however, this expansion has no effect on the long-term storage requirement of the privacy-preserving BVM because the lifetime of GT instances is short (they are only valid during the execution time of a single transaction).

It should be noted that the nodes which take part in evaluation or verification of smart contract methods via the GC-based MPC protocol have access to GT instances in their "raw" form (i.e., the labels), and thus an attacker that corrupts such a node may attempt to use this information for malicious purposes. For example, suppose a corrupted evaluator node knows that a given GT instance is the garbledtext result of some secure operation in a new block being created by the node; in this scenario, the corrupted node may attempt inject that GT instance to a method of some smart contract in the block, such that the method decrypts it. Fortunately, the stateful GC-based MPC protocol described in section 3.3.2 above ensures that all GT instances are unpredictable and are only known to the evaluators (and everyone else) at the time of evaluation (and never before).

4.2 Security Metadata

To implement the ciphertext and inputtext data types, a number of new security keys are used: a network key nk that is assigned to the blockchain network as a whole, a user key uk that is assigned to each user of the blockchain network, and a key-retrieval key that is also assigned to each user. In various embodiments, network key nk is a symmetric encryption key that is generated in a distributed manner upon network startup (using a key generation protocol), which causes each node in the blockchain network that is designated to participate in the GC-based MPC protocol to receive a secret share $nk_i$. These nodes use their shares of nk to encrypt and decrypt instances of CT as needed (for example, to load a CT instance from storage and convert it into a GT instance).

User key uk is a symmetric encryption key that a user uses to provide confidential data to the blockchain network. In contrast to the conventional public/private key pair that such a user uses to sign transactions (which can be generated entirely on the user side), uk is generated by the blockchain network. In particular, the network generates uk in a distributed manner and provides a secret share of the key to each node (such that node i holds share $uk_i$). When the user wishes to submit confidential data (e.g., as an argument to a smart contract method), the user encrypts the data using his/her user key uk, resulting in an instance of a CT, and signs the CT instance and associated transaction details using his/her private signing key, resulting in an instance of an IT. The nodes that receive the transaction then verify the signature of the IT instance using the user's public key and decrypt the CT instance via MPC using their respective shares of uk.

The key-retrieval key is a public key that is generated by a user in order to retrieve his/her user key uk from the blockchain network. In particular, the user generates a pair of asymmetric encryption and decryption keys ek and dk (where ek is the key-retrieval key) and submits ek to the network via a transaction. Upon receiving key-retrieval key ek, the blockchain network encrypts the user's user key uk using ek (without disclosing uk) and returns the encryption result to the user. The user then uses decryption key dk to decrypt that message and obtain user key uk, which the user can thereafter use to submit confidential data to the network.

4.3 Authenticated Memory, Authenticated Storage, and Garbled Execution Environment As mentioned previously, given the transparency of blockchain networks, it is crucial that confidential data (which may take the form of ciphertext, inputtext, or garbledtext) is protected against malicious copying and unauthorized access. Authenticated memory, authenticated storage, and the garbled execution environment are three mechanisms/components implemented by the privacy-preserving BVM of the present disclosure (as shown in FIG. 4) for achieving this goal.

4.3.1 Authenticated Memory and Storage

Recall that, in order for a smart contract method to perform some computation on a state variable v, that data must first be loaded from storage into memory. In particular, the method provides v's location loc in storage to the SLOAD (or other similar) opcode, which causes the content of v to be read from loc and pushed onto the memory stack. Conversely, in order for the smart contract method to persistently store some value to state variable v, the method provides the value and v's storage location loc to the SSTORE (or other similar) opcode, which causes the value to be written to loc.

Further, recall that BVMs such as the EVM keep track of the depth (or in other words, level of nesting) of smart contract execution via a depth variable. For example, when an EOA issues a transaction that calls a method method1 on a smart contract contract1, the execution of method1 begins at depth=1. If method1 then calls another method method2 on another smart contract contract2, the depth variable changes from 1 to 2 (and changes back to 1 when method2 returns to method1), and so on. Method calls within the same smart contract do not change depth.

With the foregoing in mind, authenticated memory can be implemented as a map of the form $\mu: \mathbb{N} \rightarrow CT^*$ such that, for each execution depth d, the map maintains all authenticated CT instances for d. A CT instance ct that is determined to be authenticated for a given depth d via this map can be converted into garbledtext for secure manipulation within the garbled execution environment at depth d and can be persisted to authenticated storage.

Authenticated storage can be implemented as a secondary (shadow) storage that is maintained on a per-contract basis. Specifically, each smart contract at an address addr can be associated with another smart contract at address addr' that comprises solely storage (and no smart contract code). The storage of the smart contract at addr' forms the authenticated storage of the smart contract at addr. The relationship between addr and addr' is one-to-one, so that a malicious entity cannot associate another address addr" to either addr or addr'. If a valid CT instance ct resides at a location loc of the "normal" storage at address addr, then the authenticated storage at address addr' will also contain ct at location loc.

4.3.1.1 Operations and Rules for Protecting Confidential Data

The main purpose of authenticated memory and authenticated storage is to prevent an attacker from copying a CT instance from one smart contract to another. Copying in this context refers to hardcoding the content of the CT instance in another smart contract or transmitting/passing it as an argument.

Figure 8:
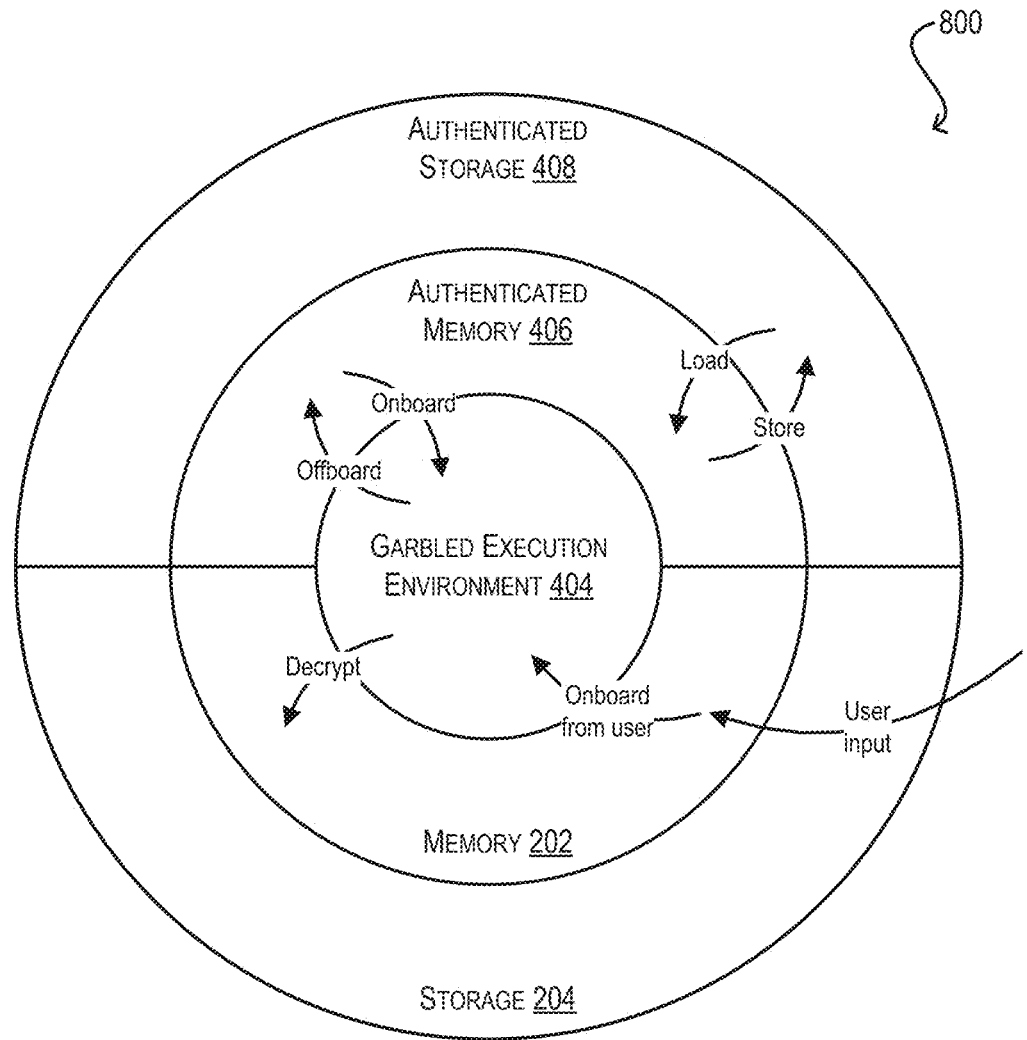
FIG. 8 depicts operations supported by the privacy-preserving BVM according to certain embodiments.

Given the properties of authenticated memory and authenticated storage explained above, the following is a list of operations that may be invoked by smart contract developers on confidential data within their smart contracts and corresponding rules that may be applied by the privacy-preserving BVM with respect to its authenticated memory and authenticated storage for protecting that confidential data from malicious copying. Specifically, these operations and rules (which are depicted in diagram 800 of FIG. 8) ensure that an authenticated CT instance cannot transit between execution depths and cannot be converted into a GT instance by a smart contract that does not own it.

Load (from storage)—This operation is invoked by a smart contract method for loading a CT instance ct held at a storage location loc from storage into memory. Upon being invoked at an execution depth d, the privacy-preserving BVM can check the authenticated storage of the smart contract to determine whether ct is also found at storage location loc there. If the answer is yes, the BVM can add ct to the authenticated memory for the current transaction (i.e., map $\mu$) at depth d; otherwise, the BVM can simply load ct into normal (unauthenticated) memory.

Onboard—This operation is invoked by a smart contract method for converting a CT instance ct that is held in memory into a GT instance gt that can be manipulated in the garbled execution environment. Upon being invoked at an execution depth d, the privacy-preserving BVM can check whether ct is mapped to d in the authenticated memory for the current transaction (i.e., is in map $\mu$). If the answer is yes, the BVM can decrypt ct using network key nk, translate the decrypted content into GT instance gt, and place gt in the garbled execution environment.

Onboard from user—This operation is invoked by a smart contract method for converting an IT instance it that is received from a user as part of the method invocation into a GT instance gt that can be manipulated in the garbled execution environment. Upon being invoked, the privacy-preserving BVM can validate the signature of it using the user's public key. If this validation is successful, the BVM can then decrypt the ciphertext wrapped within it, decrypt the ciphertext using the user's user key uk, translate the decrypted content into GT instance gt, and place gt in the garbled execution environment.

Offboard—This operation is invoked by a smart contract method for converting a GT instance gt held in the garbled execution environment into a CT instance ct held in the authenticated memory for the current transaction. Upon being invoked at an execution depth d, the privacy-preserving BVM can decode gt into plaintext (without disclosing this plaintext to anyone), encrypt the plaintext into ct using network key nk, and add ct to the authenticated memory at d.

Offboard to user—This operation is invoked by a smart contract method for converting a GT instance gt held in the garbled execution environment into a CT instance ct that will be provided to a user. Upon being invoked, the privacy-preserving BVM can decode gt into plaintext, encrypt the plaintext into ct using the user's user key uk, and add ct to normal memory.

Decrypt—This operation is invoked by a smart contract method for decrypting a GT instance gt held in the garbled execution environment into plaintext format (to be seen by all). Upon being invoked, the privacy-preserving BVM can decode gt into plaintext pt and add pt to normal memory.

Store (to storage)—This operation is invoked by a smart contract method for writing a CT instance ct held in memory to its storage location loc in storage. Upon being invoked at an execution depth d, the privacy-preserving BVM can check whether ct is mapped to d in the authenticated memory for the current transaction (i.e., is in map μ). If the answer is yes, the BVM can write ct to both the normal storage and authenticated storage of the smart contract at location loc; otherwise, the BVM can simply write ct to the normal storage at location loc and ensure that loc is empty in the authenticated storage.

Clean memory—This operation is executed automatically by the privacy-preserving BVM for cleaning out authenticated memory at the time of a depth change. For example, if depth d is decreased from d to d'<d (which will occur when a smart contract method returns, reverts, etc.), the privacy-preserving BVM will erase its authenticated memory for d (or in other words, remove all mappings pertaining to d). Further, if depth d is increased from d to d+1 (which will occur on a method call to a different smart contract), the BVM will erase its authenticated memory for d+1 (or in other words, remove all mappings pertaining to d+1).

4.3.1.2 Example Smart Contract

To clarify how the foregoing operations may be used, listings 5 and 6 below present two versions of an example Voting smart contract comprising a vote method. This vote method takes as input a variable cand (corresponding to a vote submitted by a user for either candidate 1 or candidate 2) and increments one of two state variables accordingly: a first state variable cand1_count holding the vote total for candidate 1 and a second state variable cand2_count holding the vote total for candidate 2. The first version of the Voting contract shown in listing 5 does not implement any confidentiality while the second version shown in listing 6 employs the foregoing operations (and the secret data types mentioned previously) to keep the variables cand1_count, cand2_count, and cand private. In this second version, the user/EOA calling the vote method is identified by the address sender_addr.

```
Listing 5

1:    Contract Voting {
2:        uint8 cand1_count;
3:        uint8 cand2_count;
4:        Method vote (uint8 cand) {
5:            bool cand1 = eq(cand, 1); // returns 1 if cand=1,
otherwise returns 0
6:            bool cand2 = eq(cand, 2); // returns 1 if cand=2,
otherwise returns 0
7:            uint8 cand1_count' = cand2_count + 1;
8:            uint8 cand2_count' = cand2_count + 1;
9:            cand1_count = mux(cand1, cand1_count', cand1_count); //
returns cand1_count' if cand1=0, otherwise returns cand1_count
10:           cand2_count = mux(cand2, cand2_count', cand2_count); //
returns cand2_count' if cand2=1, otherwise returns cand1_count
11:       }
12:   }
```

```
Listing 6

1:    Contract Voting {
2:        ctUint8 ct_cand1_count;
3:        ctUint8 ct_cand2_count;
4:        Method vote (itUint8 cand) {
5:            gtUint8 gt_cand = OnboardFromUser(cand,
sender_addr);
6:            gtBool gt_cand1 = eq(gt_cand, 1);
7:            gtBool gt_cand2 = eq(gt_cand, 2);
8:            gtUint8 gt_cand1_count = Onboard(Load(cand1_count));
9:            gtUint8 gt_cand2_count = Onboard(Load(cand2_count));
10:           gtUint8 gt_cand1_count' = gt_cand1_count + 1;
11:           gtUint8 gt_cand2_count' = gt_cand2_count + 1;
12:           gt_cand1_count = mux(gt_cand1, gt_cand1_count',
gt_cand1_count);
13:           gt_cand2_count = mux(gt_cand2, gt_cand2_count',
gt_cand2_count);
14:           ct_cand1_count = Store(gt_cand1_count);
15:           ct_cand2_count = Store(gt_cand2_count);
16:       }
17:   }
```

As can be seen, the second version of the Voting contract presented in listing 6 uses various secret (CT, IT, and GT) data types in place of the standard data types used by the first version shown in listing 5 (e.g., ctUint8 in place of uint8 for cand1_count and cand2_count, etc.). In addition, the second version invokes the OnboardFromUser operation to convert the IT variable cand into a corresponding GT variable gt_cand, the Load and Onboard operations to convert the CT variables ct_cand1_count and ct_cand2_count into the corresponding GT variables gt_cand1_count and gt_cand2_count, and so on.

When the vote method of the second version of the contract is called, the nodes of the blockchain network that implement the GC-based MPC protocol will build a computation tree comprising pre-computed garbled circuits for the eq, mux, and addition operators used in the method, as described in section 3.3.2. The nodes will then evaluate the garbled circuits in the order defined by the computation tree on the garbled inputs specified in the method, resulting the garbled outputs gt_cand1_count and gt_cand2_count.

4.3.2 Garbled Execution Environment

The garbled execution environment is a logical execution environment in which the privacy-preserving BVM of the present disclosure executes the GC-based MPC protocol on confidential data (and more precisely, on GT instances). As explained above, a GT instance is generated from an IT or CT instance, only upon confirming its authenticity. Further, GT instances exist only in the context of a single transaction execution and are inherently unpredictable, due to being formed of random values that are revealed to the evaluators only at the moment of execution. Accordingly, there is no need to closely track GT instances across method calls for access control purposes, unlike IT and CT instances; they are inherently safe (i.e., cannot be reused or hardcoded) due to these properties.

5. Oracle-Driven Blockchain

Recall that in the conventional BVM blockchain transaction processing workflow depicted in FIG. 2, an execution node creates a new block B by collecting a number of transactions from the mempool, sequencing and adding the collected transactions to B, executing the transactions in order, and finalizing B with the resulting state transition. The execution node then broadcasts new block B to all other nodes. Assuming B is selected via consensus as the next block to be added to the blockchain, each node that receives B performs a final validation of the block by executing the transactions included therein and subsequently adds B to its local blockchain copy.

If one or more of the transactions included in new block B invoke a smart contract method that operates on confidential data using the techniques described in the foregoing sections, two issues become apparent with this conventional workflow. First, a single execution node cannot perform both sequencing of transactions and execution of those transactions as part of creating new block B, because the GC-based MPC protocol of the present disclosure requires collaboration by multiple execution nodes (evaluators). Second, each node that receives new block B after consensus and performs a final validation of its contents cannot independently execute the transactions in the block, again because this requires collaboration by multiple execution nodes.

To solve these and other similar and/or related issues, certain embodiments of the present disclosure provide an oracle-driven blockchain approach that implements two key features: first, it separates block creation from transaction execution, such that each new block to be added to the blockchain is first created by one or more sequencing nodes (and is agreed upon via a consensus mechanism), before any of the transactions within the block are actually executed. Second, this approach ensures that, as part of transaction execution, any output generated by the GC-based MPC protocol which changes BVM state is added to a transcript that is included within the block. These features enable the transactions in each new block to be collectively executed by a group of execution nodes that are designated to carry out the GC-based MPC protocol, and also allows other nodes to execute those transactions in an independent fashion by referring to the transcript alone (rather than re-running the MPC protocol).

It should be noted that this approach is referred to as being "oracle-driven" because, at a high level, the GC-based MPC protocol can be considered a blockchain oracle, or in other words an abstract entity that provides some external data (e.g., answers to a computational problem, real-world data feeds such as weather or stock prices, etc.) to a blockchain network. Accordingly, the techniques described in this section can be generically applied to any blockchain network that relies on a blockchain oracle for transaction execution, and the phrase "GC-based MPC protocol" can be interchangeably replaced with the more general term "blockchain oracle."

Figure 9:
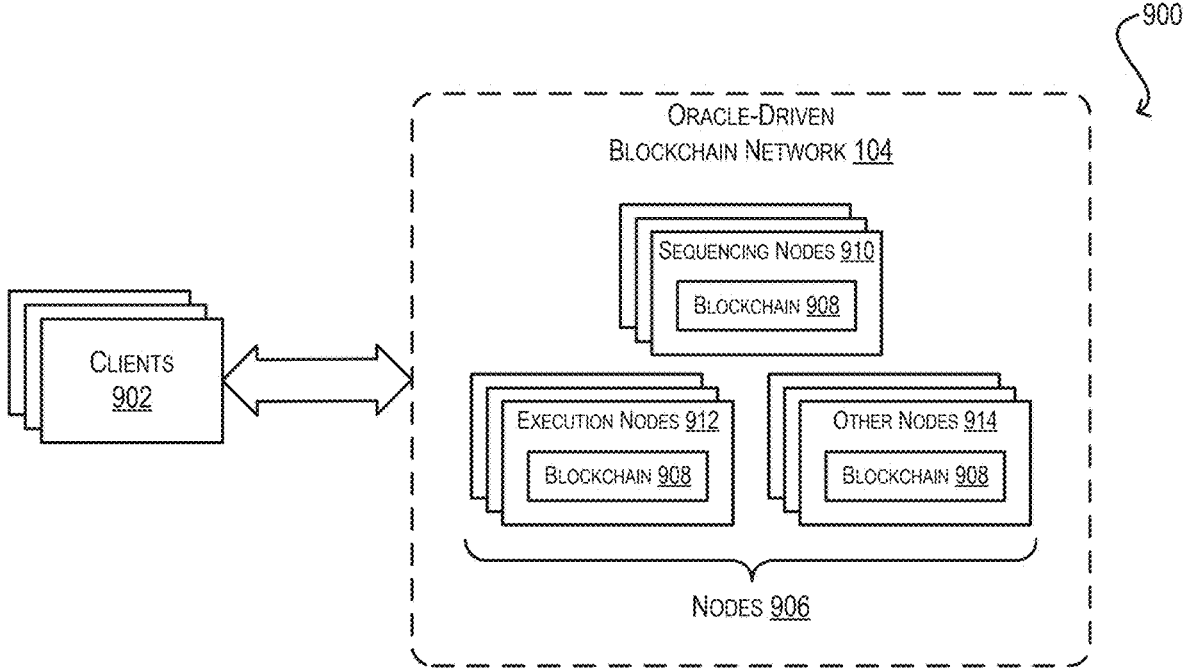
FIG. 9 depicts a blockchain environment including an oracle-driven blockchain network according to certain embodiments.

FIG. 9 depicts an example blockchain environment 900 that implements the oracle-driven blockchain approach according to certain embodiments. Environment 900 is similar to environment 100 of FIG. 1 in that it includes a set of clients 902 that are connected to a smart contract-based blockchain network 904 comprising a set of nodes 906, where each node holds a local copy of the network's blockchain 908. However, while the nodes 106 of blockchain network 100 are composed of execution nodes 110 and other nodes 112, the nodes 906 of blockchain network 900 (referred to as an oracle-driven blockchain network) are composed of three distinct node types/roles: sequencing nodes 910, execution nodes 912, and other nodes 914.

As explained in further detail below, sequencing nodes 910 are generally responsible for creating new non-canonical blocks (and sequencing the transactions in each such block), where a non-canonical block is a temporary block that represents a non-finalized version of the next block to be added to the network's blockchain. Even though a non-canonical block is non-finalized, the list of transactions and their order is indeed finalized. Execution nodes 912 are generally responsible for executing the transactions in a non-canonical block, which includes consulting/executing the GC-based MPC protocol (or some other oracle) as needed; bundling the executed transactions and resulting state transition into a canonical block (which is a finalized version of the non-canonical block); and adding the outputs of the GC-based MPC protocol (or some other oracle) to a transcript in the canonical block. And other nodes 914 are generally responsible for performing a final validation of a canonical block, which includes re-executing the transactions in the block and referring to the included transcript for any output needed from the GC-based MPC protocol (or some other oracle).

FIGS. 10A and 10B depict a workflow 1000 explaining the end-to-end processing of a transaction in blockchain network 900 in accordance with the oracle-driven blockchain approach. Workflow 1000 assumes that each node 906 of blockchain network 900 implements the privacy-preserving BVM of the present disclosure and that execution nodes 912 are designated to carry out the GC-based MPC protocol (or in other words, are evaluators of the protocol).

Starting with step 1002 of FIG. 10A, a user (sender) operating a client 902 can initiate a transaction T by creating the transaction, signing the transaction using his/her private key, and transmitting the signed transaction to nodes 906 of blockchain network 904 via client 902. Transaction T is assumed to call a smart contract method that operates on confidential data.

At step 1004, one or more sequencing nodes 910 can receive transaction T and temporarily store it in its local transaction pool. Then, at step 1006, a designated sequencing node 910 (referred to as the sequencer) selects transaction T from its transaction pool, along with one or more other transactions, for inclusion in a new non-canonical block B. The sequencer can use various criteria for performing this selection, such as the amount of gas that will be collected for each transaction.

At step 1008, the sequencer can sequence the selected transactions according to some order, perform a pseudo-execution of the transactions in order (which ignores any computations on confidential data), and add the ordered transactions, along with other relevant info such as the resulting pseudo-state transition, to non-canonical block B. For example, regarding the "pseudo-execution" of the transactions, the sequencer can use a predetermined value for any output required from the GC-based MPC protocol, rather than invoking the protocol to obtain the actual output.

The sequencer can subsequently broadcast non-canonical block B to all other nodes (step 1010), which causes each receiving node to add B as a temporary head block of its local blockchain copy 908 (step 1012). In various embodiments, two constraints are enforced with respect to the operation at step 1012. First, there can be at most one non-canonical block attached to the blockchain. Second, a canonical block cannot have a non-canonical block as its parent block.

Once non-canonical block B has reached a threshold number of execution nodes 912 (referred to as executors), each executor can execute the transactions in B in order (step 1014). As part of this processing, the executors can collectively carry out the GC-based MPC protocol for any computations on confidential data; this is referred to as an oracle consultation.

Upon executing all transactions in non-canonical block B, each executor can create a new canonical block B' that represents a finalized version of the canonical block, where canonical block B' includes among other things the list of transactions, a hash of the block header from non-canonical block B, a signature of the non-canonical block header hash (signed by the sequencer), a transcript specifying the correct outcomes of any oracle consultations made by execution nodes 912 during transaction execution, and a hash of the transcript (step 1016). Each executor can further sign canonical block B', add its signature to the block header of B' at a predetermined location, and exchange its signature with all other executors (step 1018). In response to receiving signatures from the other executors, each executor can add the received signatures to the canonical block header at respective predetermined locations (step 1020). By way of example, FIG. 11 illustrates a portion 1100 of the header of canonical block B' that includes these signatures. Once step 1020 is completed by all executors, each executor will have the exact same canonical block B'; thus, the order of completion (which may be arbitrarily affected by hardware capabilities and network state) has no significance.

Turning now to FIG. 10B, at step 1022, the executors can broadcast canonical block B' to all nodes. In response, each receiving node can validate canonical block B' by executing the transactions in the block (step 1024). To re-execute the transactions without access to the GC-based MPC protocol, each node can refer to the transcript in the block for any outputs needed from the protocol.

Finally, at step 1026, each node can replace non-canonical block B in its local blockchain copy with canonical block B', thereby returning the blockchain to a fully canonical (final) state and officially recording transaction T (as well as all other transactions in B') in the blockchain.

5.1 Security Considerations

One of the purposes of the non-canonical block created by the sequencer is to provide security by consensus. For example, consider the possibility of simply sending a list of transactions to the execution nodes; while this approach may be easier to implement, it provides no guarantees as to the order of executed transactions, nor to the prevention of mis-use of the oracle (MPC protocol) by malicious actors. The workflow above ensures that the non-canonical block created by the sequencer is immutable, even after it is replaced with a canonical block created by the executors. This is achieved by including a hash of the non-canonical block's header and the sequencer's signature of that hash in the canonical block, which is then signed by all executors. With this approach, the non-canonical block can be reconstructed by executing the transactions in the block and the hash of its header (as well as all signatures) can be validated, all the way back to the genesis block. In addition, having the transactions included in the non-canonical block has the advantage of making sure the sequenced transactions are dependent on the latest canonical state of the blockchain.

6. Example Computer System

Figure 12:
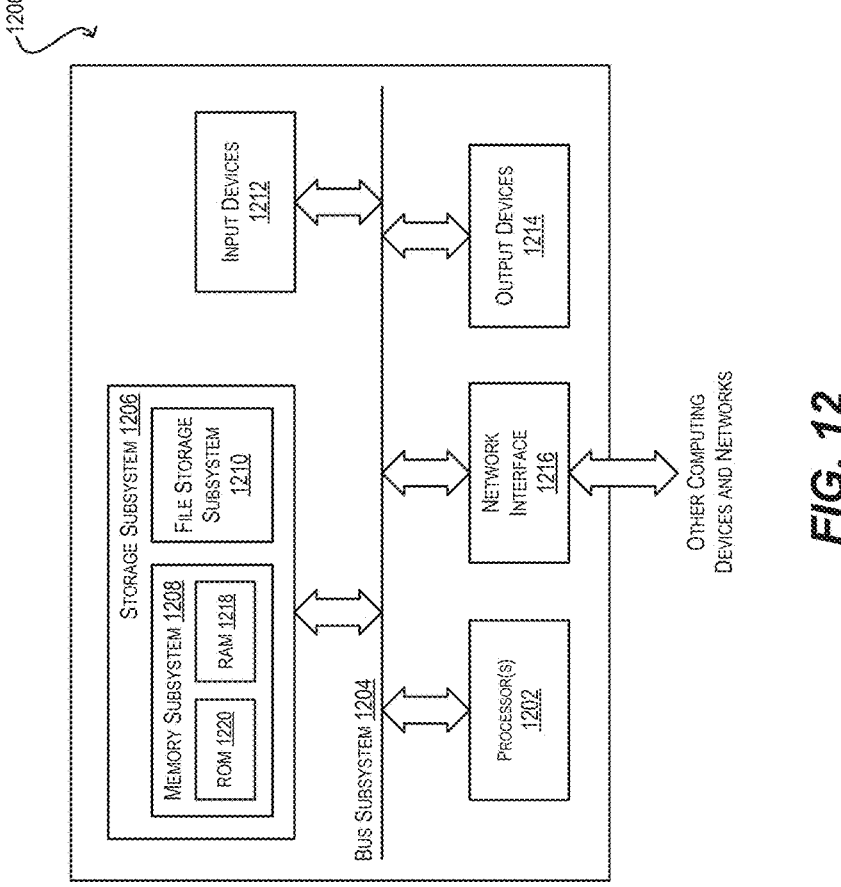
FIG. 12 depicts an example computer system according to certain embodiments.

FIG. 12 is a simplified block diagram of an example computer system 1200 according to certain embodiments. Computer system 1200 (and/or equivalent systems/devices) may be used to implement any of the techniques described in the foregoing sections. As shown in FIG. 12, computer system 1200 includes one or more processors 1202 that communicate with a number of peripheral devices via a bus subsystem 1204. These peripheral devices include a storage subsystem 1206 (comprising a memory subsystem 1208 and a file storage subsystem 1210), user interface input devices 1212, user interface output devices 1214, and a network interface subsystem 1216.

Bus subsystem 1204 can provide a mechanism for letting the various components and subsystems of computer system 1200 communicate with each other as intended. Although bus subsystem 1204 is shown schematically as a single bus, alternative embodiments of the bus subsystem can utilize multiple buses.

Network interface subsystem 1216 can serve as an interface for communicating data between computer system 1200 and other computer systems or networks. Embodiments of network interface subsystem 1216 can include, e.g., an Ethernet module, a Wi-Fi and/or cellular connectivity module, and/or the like.

User interface input devices 1212 can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information into computer system 1200.

User interface output devices 1214 can include a display subsystem and non-visual output devices such as audio output devices, etc. The display subsystem can be, e.g., a transparent or non-transparent display screen such as a liquid crystal display (LCD) or organic light-emitting diode (OLED) display that is capable of presenting 2D and/or 3D imagery. In general, use of the term "output device" is intended to include all possible types of devices and mechanisms for outputting information from computer system 1200.

Storage subsystem 1206 includes a memory subsystem 1208 and a file/disk storage subsystem 1210. Subsystems 1208 and 1210 represent non-transitory computer-readable storage media that can store program code and/or data which provide the functionality of embodiments of the present disclosure in a non-transitory state.

Memory subsystem 1208 includes a number of memories including a main random access memory (RAM) 1218 for storage of instructions and data during program execution and a read-only memory (ROM) 1220 in which fixed instructions are stored. File storage subsystem 1210 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of non-volatile storage media known in the art.

It should be appreciated that computer system 1200 is illustrative and other configurations having more or fewer components than computer system 1200 are possible.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

What is claimed is:

1. A method performed by a blockchain network comprising a plurality of nodes, the method comprising:
    selecting, by a sequencing node in the plurality of nodes, a set of transactions from a transaction pool, the set of transactions including a first transaction that requires an output from an oracle;
    ordering, by the sequencing node, the set of transactions;
    executing, by the sequencing node, the ordered set of transactions in order, wherein the executing involves using a predetermined value for the output from the oracle rather than invoking the oracle to obtain the output;
    adding, by the sequencing node, the ordered set of transactions and state information pertaining to a result of the executing to a non-canonical block; and
    broadcasting, by the sequencing node, the non-canonical block to the plurality of nodes.

2. The method of claim 1 wherein each node in the plurality of nodes that receives the non-canonical block:
    adds the non-canonical block as a head block to a local blockchain copy maintained by the node.

3. The method of claim 2 wherein the plurality of nodes includes a set of execution nodes, and wherein each execution node in the set of execution nodes that receives the non-canonical block further:
    executes the ordered set of transactions in order, the executing comprising invoking the oracle to obtain the output;
    adds the ordered set of transactions and a transcript to a canonical block, the transcript including the output obtained from the oracle;
    replaces the non-canonical block in the execution node's local blockchain copy with the canonical block; and
    broadcasts the canonical block to the plurality of nodes.

4. The method of claim 3 wherein each node in the plurality of nodes that receives the canonical block:
    executes the ordered set of transactions in the canonical block in order, wherein the executing involves retrieving the output from the transcript rather than invoking the oracle to obtain the output; and
    replaces the non-canonical block in the node's local blockchain copy with the canonical block.

5. The method of claim 3 wherein the canonical block further includes a hash of a block header of the non-canonical block and a first signature of the hash of the block header that is signed by the sequencing node.

6. The method of claim 5 wherein the canonical block further includes a hash of the transcript.

7. The method of claim 6 wherein the canonical block further includes a second signature of the hash of transcript and the first signature, the second signature being signed by the execution node.

8. The method of claim 7 wherein the execution node transmits the second signature to other execution nodes in the plurality of execution nodes.

9. The method of claim 7 wherein the execution node receives third signatures of the hash of the transcript and the first signature that are signed by other execution nodes in the plurality of execution nodes, and adds the third signatures to the canonical block in a predetermined order.

10. The method of claim 3 wherein the oracle is executed by the set of execution nodes.

11. The method of claim 10 wherein the oracle implements a secure multi-party computation (MPC) protocol.

12. The method of claim 11 wherein the MPC protocol is a garbling scheme-based MPC protocol.

13. The method of claim 11 wherein the first transaction is a transaction that operates on secret data, and wherein the oracle generates the output without revealing the secret data to the set of execution nodes.

14. The method of claim 1 wherein the oracle is executed by an entity external to the blockchain network.

15. A non-transitory computer readable storage medium having stored thereon program code executable by a blockchain network comprising a plurality of nodes, the program code embodying a method comprising:
    selecting, by a sequencing node in the plurality of nodes, a set of transactions from a transaction pool, the set of transactions including a first transaction that requires an output from an oracle;
    ordering, by the sequencing node, the set of transactions;
    executing, by the sequencing node, the ordered set of transactions in order, wherein the executing involves using a predetermined value for the output from the oracle rather than invoking the oracle to obtain the output;
    adding, by the sequencing node, the ordered set of transactions and state information pertaining to a result of the executing to a non-canonical block; and
    broadcasting, by the sequencing node, the non-canonical block to the plurality of nodes, thereby causing each node in the plurality of nodes to add the non-canonical block as a head block to a local blockchain copy maintained by the node.

16. The non-transitory computer readable storage medium of claim 15 wherein the plurality of nodes includes a set of execution nodes, and wherein each execution node in the set of execution nodes that receives the non-canonical block:
    executes the ordered set of transactions in order, the executing comprising invoking the oracle to obtain the output;
    adds the ordered set of transactions and a transcript to a canonical block, the transcript including the output obtained from the oracle;
    replaces the non-canonical block in the execution node's local blockchain copy with the canonical block; and
    broadcasts the canonical block to the plurality of nodes.

17. The non-transitory computer readable storage medium of claim 16 wherein each node in the plurality of nodes that receives the canonical block:

executes the ordered set of transactions in the canonical block in order, wherein the executing involves retrieving the output from the transcript rather than invoking the oracle to obtain the output; and replaces the non-canonical block in the node's local blockchain copy with the canonical block.

18. A computer system acting as a sequencing node in a blockchain network comprising a plurality of nodes, the computer system comprising:

one or more processors; and a non-transitory computer readable medium having stored thereon program code that, when executed, causes the one or more processors to:

select, by a sequencing node in the plurality of nodes, a set of transactions from a transaction pool, the set of transactions including a first transaction that requires an output from an oracle;

order, by the sequencing node, the set of transactions;

execute, by the sequencing node, the ordered set of transactions in order, wherein the executing involves using a predetermined value for the output from the oracle rather than invoking the oracle to obtain the output;

add, by the sequencing node, the ordered set of transactions and state information pertaining to a result of the executing to a non-canonical block; and broadcast, by the sequencing node, the non-canonical block to the plurality of nodes, thereby causing each node in the plurality of nodes to add the non-canonical block as a head block to a local blockchain copy maintained by the node.

19. The computer system of claim 18 wherein the plurality of nodes includes a set of execution nodes, and wherein each execution node in the set of execution nodes that receives the non-canonical block:

executes the ordered set of transactions in order, the executing comprising invoking the oracle to obtain the output;

adds the ordered set of transactions and a transcript to a canonical block, the transcript including the output obtained from the oracle;

replaces the non-canonical block in the execution node's local blockchain copy with the canonical block; and broadcasts the canonical block to the plurality of nodes.

20. The computer system of claim 19 wherein each node in the plurality of nodes that receives the canonical block:

executes the ordered set of transactions in the canonical block in order, wherein the executing involves retrieving the output from the transcript rather than invoking the oracle to obtain the output; and replaces the non-canonical block in the node's local blockchain copy with the canonical block.

* * * * *